United States Patent [19]
Nakajima

[11] Patent Number: 5,992,372
[45] Date of Patent: Nov. 30, 1999

[54] TRANSIENT CONTROL BETWEEN TWO SPARK-IGNITED COMBUSTION STATES IN ENGINE

[75] Inventor: Yuki Nakajima, Yokohama, Japan

[73] Assignee: Nissan Motor Co., Ltd., Yokohama, Japan

[21] Appl. No.: 09/083,430

[22] Filed: May 21, 1998

[30] Foreign Application Priority Data

May 21, 1997 [JP] Japan .................................. 9-131198
Jun. 2, 1997 [JP] Japan .................................. 9-144172

[51] Int. Cl.$^6$ ...................................................... F02B 17/00
[52] U.S. Cl. ............................ 123/295; 123/305; 701/105
[58] Field of Search .................................. 123/295, 305, 123/406.47, 492, 493; 701/105

[56] References Cited

U.S. PATENT DOCUMENTS 5,078,107  1/1992  Morikawa ................................. 123/295
5,911,206  6/1999  Bylsma .................................... 123/295

FOREIGN PATENT DOCUMENTS 59-37236   2/1984  Japan .
3-281965  12/1991  Japan .

Primary Examiner—Tony M. Argenbright
Assistant Examiner—Arnold Castro
Attorney, Agent, or Firm—Foley & Lardner

[57] ABSTRACT

What is disclosed is a vehicle engine control system responsive to a change between a first request for homogeneous charge combustion and a second request for stratified charge combustion. A spark-ignition cylinder-injection internal combustion engine has cylinders, each performing an intake phase, a compression phase, a power phase, and an exhaust phase. The cylinders each, when rendered operable in a first mode, experience first fuel injection at a first fuel injection timing during intake phase thereof and first spark ignition at a first ignition timing to initiate homogeneous charge combustion. The cylinders each, when rendered operable in a second mode, experiences second fuel injection at a second fuel injection timing during compression phase and second spark ignition at a second ignition timing to initiate stratified charge combustion. A fuel injection manager is operable to set one of the first fuel injection and second fuel injection for the cylinders in a predetermined sequential order in response to one of the first and second request. A spark ignition manager is operable to set one of the first spark ignition and second spark ignition for the cylinders in the predetermined sequential order in response to one of the first fuel injection and the second fuel injection that has been set to each of the cylinders.

17 Claims, 16 Drawing Sheets

TRANSIENT CONTROL BETWEEN TWO SPARK-IGNITED COMBUSTION STATES IN ENGINE

CROSS-REFERENCE TO RELATED APPLICATIONS

Disclosure of the entire contents of Japanese Patent Applicatons Nos. 9-144172 filed Jun. 6, 1997 and 9-131198 filed May 21, 1997 is incorporated herein by reference.

FIELD OF THE INVENTION

The present invention relates to a transient control between two combustion states, namely, homogeneous charge combustion and stratified charge combustion, in an internal combustion engine of the spark-ignition cylinder-injection type.

BACKGROUND OF THE INVENTION

Recently, there is a growing attention paid to internal combustion engines of the spark-ignition cylinder-injection type.

JP-A 59-37236 discloses a fuel injection timing control for an internal combustion engine of the above kind. This engine performs an intake phase, a compression phase, a power phase and an exhaust phase and has a throttle valve in an air induction system that opens in degrees in response to depression of a gas pedal. According to this fuel injection timing control, information as to the engine rpm and information as to intake airflow rate are used in computing a base amount of fuel injection. In other words, the base amount of fuel injection is determined as a function of engine rpm and airflow rate and represents operator power requirement. The base amount of fuel injection is compared with a predetermined value. If the former is less than the latter, that is, power requirement is small, a table lookup operation of a two-dimensional table is performed based on engine rpm and airflow rate to determine an appropriate crankshaft position at which fuel injection should end. The base amount of fuel injection is converted into a fuel injector opening duration expressed in terms of crankshaft angles. These crankshaft angles are subtracted from the determined crankshaft position to give a result as a crankshaft position at which fuel injection should begin. Suppose the base amount of fuel injection is not less than the predetermined value, that is, power requirement is medium or large. In this case, a table look-up operation of another two-dimensional table is performed based on engine rpm and airflow rate to determine an appropriate crankshaft position at which fuel injection should begin. With this fuel injection timing management, stratified charge is formed to meet small power requirement, while homogeneous charge is formed to meet medium or large power requirement. The first mentioned two-dimensional table contains crankshaft angles ranging from 50° BTDC to 100° BTDC. The second two-dimensional table contains crankshaft angles ranging from 140° BTDC to 330° BTDC.

JP-A 3-281965 teaches performing a table look-up operation of a map in determining an appropriate spark timing for each of stratified charge combustion state and homogeneous charge combustion state.

Homogeneous charge combustion or stratified charge combustion is required to meet varying operating condition under which an internal combustion engine operates. Upon or immediately after a change, in request, from stratified charge combustion to homogeneous charge combustion, a special care has to be paid to the fact a fuel injection instant for homogeneous charge combustion be well in advance of an appropriate fuel injection instant for stratified charge combustion.

Thus, it is inevitable to allow at least one, if any, of cylinders to continue to perform stratified charge combustion immediately after the change, in request, to homogeneous charge combustion. With regard to such a cylinder that continues to perform stratified charge combustion, spark timing appropriate for homogeneous charge combustion Is adjusted to produce a spark to burn combustible charge resulting from the fuel injection in quantity and timing that are appropriate for stratified charge. This may result In incomplete combustion or occurrence of knock, causing increased emission of noxious components in the exhaust gas and a drop in derivability.

Therefore, it has been demanded that, immediately after a shift, in requirement, between stratified and homogeneous charge combustion, the ignition timing control as well as the fuel injection control switch, without any error, from stratified charge mode to homogeneous charge mode or vice versa form one individual cylinder to another.

Theoretically, it is possible to compute fuel injection quantity, fuel injection timing, and ignition timing appropriate for stratified charge combustion as well as those thru homogeneous charge combustion over the whole range of operation of the engine. In this case, operation time becomes long, increasing possibility that the engine controller might leave some of the jobs unfinished when the engine operates at high speeds.

An object of the present invention is to meet the above-mentioned demand.

SUMMARY OF THE INVENTION

According to the present invention, there is provided a vehicle engine control system responsive to a change between a first request for homogeneous charge combustion and a second request for stratified charge combustion, said vehicle engine control system comprising:

a spark-ignition cylinder-injection internal combustion engine having cylinders, each performing an intake phase, a compression phase, a power phase, and an exhaust phase;

said cylinders each, when rendered operable in a first mode, experiencing first fuel injection at a first fuel injection timing during intake phase thereof and first spark ignition at a first ignition timing to initiate homogeneous charge combustion;

said cylinders each, when rendered operable in a second mode, experiencing second fuel injection at a second fuel injection timing during compression phase and second spark ignition at a second ignition timing to initiate stratified charge combustion;

a fuel injection manager being operable to set one of said first fuel injection and second fuel injection for said cylinders in a predetermined sequential order in response to one of the first and second request; and a spark ignition manage being operable to set one of said first spark ignition and second spark ignition for said cylinders in the predetermined sequential order in response to one of said first fuel injection and said second fuel injection that has been set to each of said cylinders.

DESCRIPTION OF THE PREFERRED EMBODIMENTS

Referring to FIGS. 1 to 11, a first embodiment according to the present invention is described.

Figure 1:
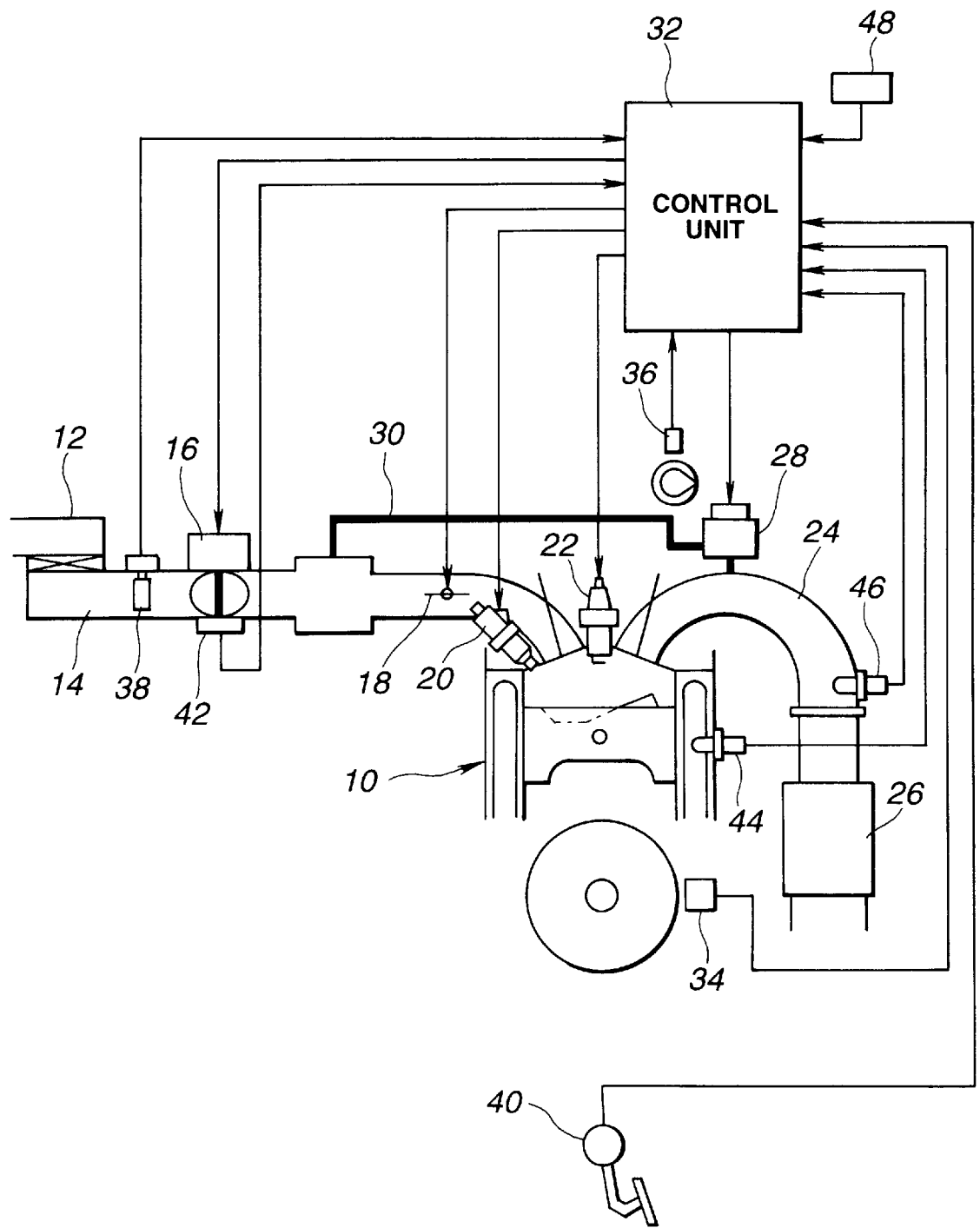
FIG. 1 is a schematic view of an engine control system for an internal combustion engine.

FIG. 1 illustrates an engine controlling system installed in an automotive vehicle.

In FIG. 1, the reference numeral 10 designates a mult-cylinder internal combustion engine of the fuel injection and spark ignition type. Each cylinder of the engine 10 has a piston therein for reciprocal motion therein to perform an intake phase, a compression phase, a power or expansion phase, and an exhaust phase in this embodiment, the four-cycle six-cylinder engine 10 is used.

An air cleaner 12 and an intake passageway 16 admit air to a combustion chamber within each cylinder that is performing intake stroke of its piston. An electronically controlled throttle valve 16 has its throttle disposed in the intake passageway at a location downstream the air cleaner 12 with respect to the air stream. The throttle opens in degrees to control, in flow rate, the admission of intake air. Disposed within each of ports of the intake passageway is a swirl-inducing valve 18. Each swirl-inducing valve 18 opens to vary cross sectional area of the associated one port, controlling angle of inflow of air, thereby con trolling motion of swirl generated within the cylinder.

The reference numeral 20 designates one of fuel injection valves (injectors) of the electronically and magnetically actuated type that are mounted to the cylinder head to inject fuel (gasoline) directly into combustion chambers within the engine cylinders, respectively. Each of the injection valves 20 opens in response to an injection pulse to allow injection of fuel that is kept at a predetermined pressure directly into the combustion chamber. During duration as long as the width of an injection pulse, electric current passes through a solenoid of the injector 20 to keep injection of fuel. Thus, amount or quantity of fuel injected is a function determined of width of an injection pulse.

As the discussion proceeds, it will be understood that individual injection pulses are supplied to individual injectors 20. For creation of homogenous charge within a cylinder to be ignited by spark at a spark or ignition plug 22, an injection pulse is supplied to the injector 20 while the piston descends in the cylinder for intake stroke. This homogeneous charge and the subsequent ignition by spark at appropriate timing result in combustion that is referred "homogeneous charge combustion" or "homogenous combustion." In the drawing, it is abbreviated "HOMO." For creation of stratified charge to form relatively rich mixture in the vicinity of the spark plug 22 in a cylinder, an injection pulse is supplied to the injector 20 While the piston ascends in the cylinder for compression stroke. The stratified charge and the subsequent ignition by spark at appropriate timing result in combustion that is referred "stratified charge combustion" or "stratified combustion." In the drawing, it is abbreviated "STRAT."

The reference numeral 24 designates an exhaust passageway. The exhaust passageway 24 has a catalytic converter 26 and discharges exhaust gases resulting from combustion in each of the engine cylinders. The catalytic converter 26 serves as an exhaust gas purifier. For suppressing occurrence of noxious nitrogen oxides during combustion in each of the engine cylinders, an EGR valve 28 of the electronically and magnetically actuated type controls, in flow rate, passage of a part of exhaust gases passes through an EGR passageway 30. At an inlet end, the EGR passageway 30 opens into the exhaust passageway 24 at a location upstream the catalytic converter 26. At an outlet end, the EGR passageway 30 opens into the intake passageway 14 at a location downstream the throttle of the throttle valve 16 and upstream each swirl-inducing valve 18.

The throttle valve 16, swirl-inducting valves 18, injectors 20, spark plugs 22, and EGR valve 28 are operable in response to commands that are determined and generated by an engine controller or control unit 32. The controller 32 may include a digital microcomputer containing such generally-known components as a central processing unit (CPU), a read only memory (ROM), a random access memory (RAM), analog to digital (A/D) converters, and an input/output interface circuit (I/O). The controller 32 receives inputs from various kinds of meter and sensors. In the description below, the commands for the injectors 20 and spark plugs 22 only are referred to for brevity of explanation of the present invention.

A crankshaft sensor 34 generates a train of reference (REF) pulses and a train of position (POS) pulses. The REF pulses are generated at regular intervals in terms of crankshaft angles with 720 degrees/n (n: number of cylinders) apart between the adjacent two pulses. Each of the REF pulses is generated at a predetermined crankshaft position of 110 degrees before top dead center (BTDC) of each compression stroke. The POS pulses are generated at regular intervals in terms of crankshaft angles with 1 degree or 2 degrees apart between the adjacent two pulses. Frequency of the REF pulses indicates engine rpm or speed. The ROM of the controller 32 computes the frequency of REF pulses to give the result as engine speed data Ne. A camshaft sensor 36 generates a train of phase indicative (PHASE) pulses at regular intervals in terms of crankshaft angles with 720 degrees apart between the adjacent two pulses. Each of the PHASE pulses is generated at a predetermined crankshaft position. The CPU of the controller 32 determines in response to the train of PHASE pulses which one of the engine cylinders is about to perform an intake phase.

An airflow meter 38 is disposed in the intake passageway 14 and generates an electric voltage indicative of flow of intake air at a location upstream of the throttle valve 16. The CPU of the controller 32 determines in response to the voltage from the airflow meter 38 an intake airflow rate Qa. An accelerator (ACC) sensor 40 is attached to an accelerator or gas pedal of the automotive vehicle. The gas pedal displaces in depression degrees in response to power demand by an operator. The ACC sensor 40 generates an electric voltage indicative the depression degrees of the gas pedal. The CPU of the controller 32 determines in response to the voltage from the ACC sensor 40 a power demand by the operator. A throttle sensor 42 is operatively connected to the throttle of the throttle valve 16 and generates an electric voltage indicative of the throttle opening degrees. The CPU of the controller 32 determines in response to the voltage from the throttle sensor 42 the throttle opening degree TVO. The throttle sensor 42 includes an idle switch that is closed or rendered ON when the throttle valve 16 is closed to an idle speed position. An engine coolant temperature sensor 44 detects temperature of the engine coolant and generates an electric voltage indicative of the detected temperature. The CPU of the controller 32 determines in response to the voltage from the temperature sensor 44 the engine coolant temperature Tw. Reference numeral 46 designates an oxygen ($O_2$) sensor. Reference numeral 48 designates a vehicle speed sensor. The CPU of the controller 32 determines in response to output of the oxygen sensor 46 whether exhaust gas air fuel ratio is on the rich side or the lean side and determines in response to output of the vehicle speed sensor 48 vehicle speed VSP of the automotive vehicle.

Referring to FIGS. 2 to 7, a fuel injection control and a spark ignition control that are conducted by the controller 32 are explained.

Figure 2:
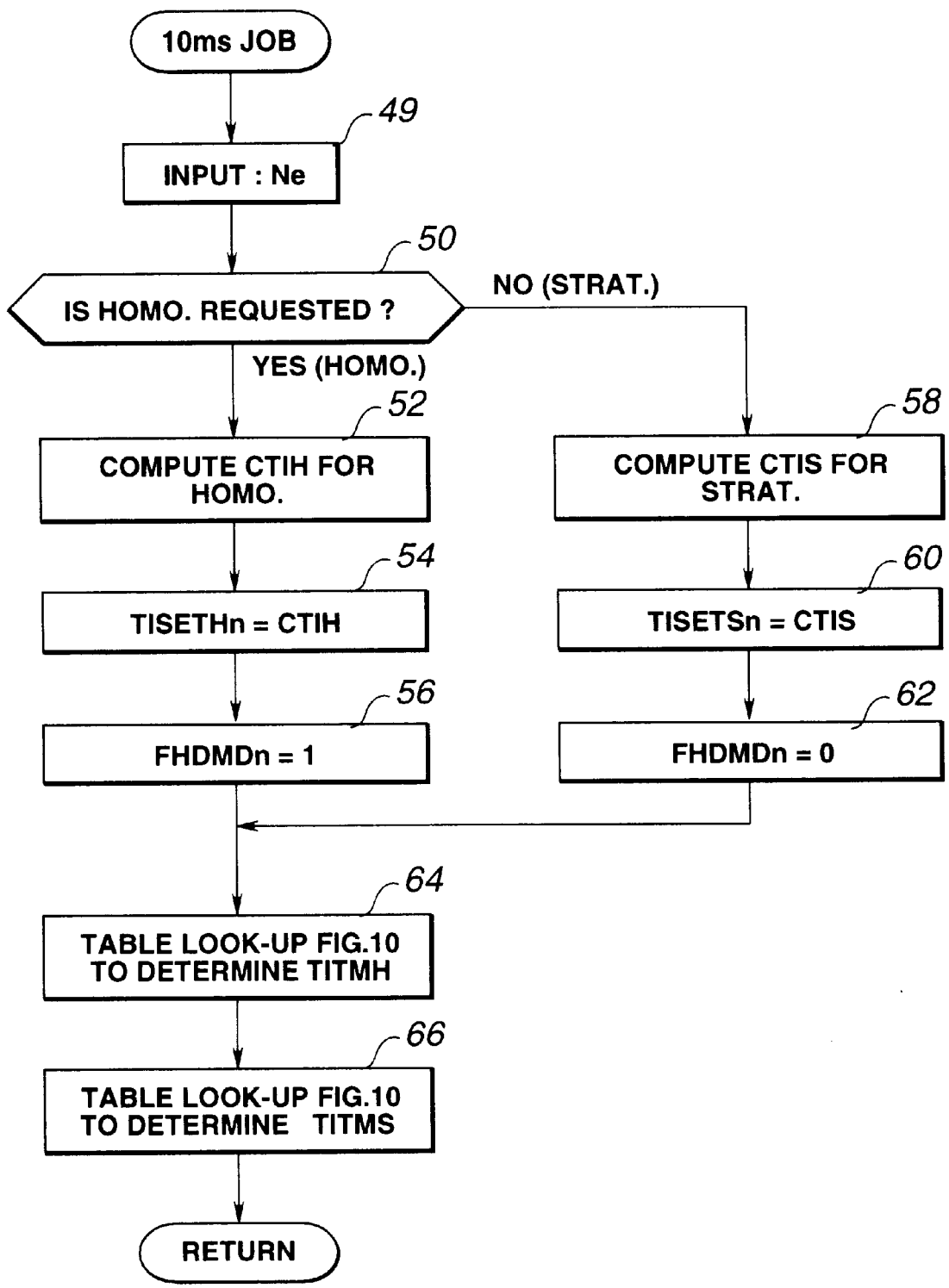
FIG. 2 is a flowchart illustrating a control routine for determining a fuel injection quantity (CTIH or CTIS) for the requested one of homogeneous charge combustion and stratified charge combustion, and fuel injection timings (TITMH & TITMS) for both types of combustion.

FIG. 2 illustrates a control routine that is executed at regular intervals of 10 milliseconds (ms).

At step 49, the controller 32 inputs information of the engine speed Ne.

At step 50, the controller 32 determines whether or not homogeneous charge combustion is requested.

Before proceeding further, it is now explained how to determine which one of homogeneous combustion and stratified combustion is requested and then commanded.

A target value of drive force tTd is determined in response to operator power demand ACC and vehicle speed VSP. A target value of engine torque tTe is determined in response to the determined target drive force tTd, a speed ratio in an automatic transmission and a torque ratio of a torque converter. The torque converter and the automatic transmission form a part of a drive train of the automotive vehicle together with the engine. The controller 32 has stored in the ROM plural maps, which have been prepared for different conditions as represented, for example, by coolant temperature Tw and time interval after engine started. The maps each contain different values of base target equivalent ratio TFBYAO and requested combustion states against different combinations of values of engine speed Ne and value of target engine torque tTe.

The controller 32 determines a value of base target equivalent ratio TFBYAO and one of homogeneous and stratified combustion by performing a table look-up operation of one of the above-mentioned maps. In this manner, the controller 32 determines which one of homogeneous and stratified combustion is requested.

The base target equivalent ratio TFBYAO is corrected with correction values including a correction value indicative of combustion efficiency. The result is further modified with a first order delay that is equivalent to time taken for air quantity to flow from the throttle chamber of the throttle valve 16 to the cylinder, giving a target equivalent ratio TFBYA. The target equivalent ratio TFBYA is used for computing the fuel injection quantity. This target ratio TFBYA, which may be also referred to as a target fuel-air correction coefficient, may be expressed as 14.5/tAF, where tAF is a target air fuel ratio.

A change between request for stratified combustion and request for homogeneous combustion takes place before occurrence of a change between command for stratified combustion and command for homogeneous take. The former change may be named "request change," and the latter change may be named "command change."

Figure 8:
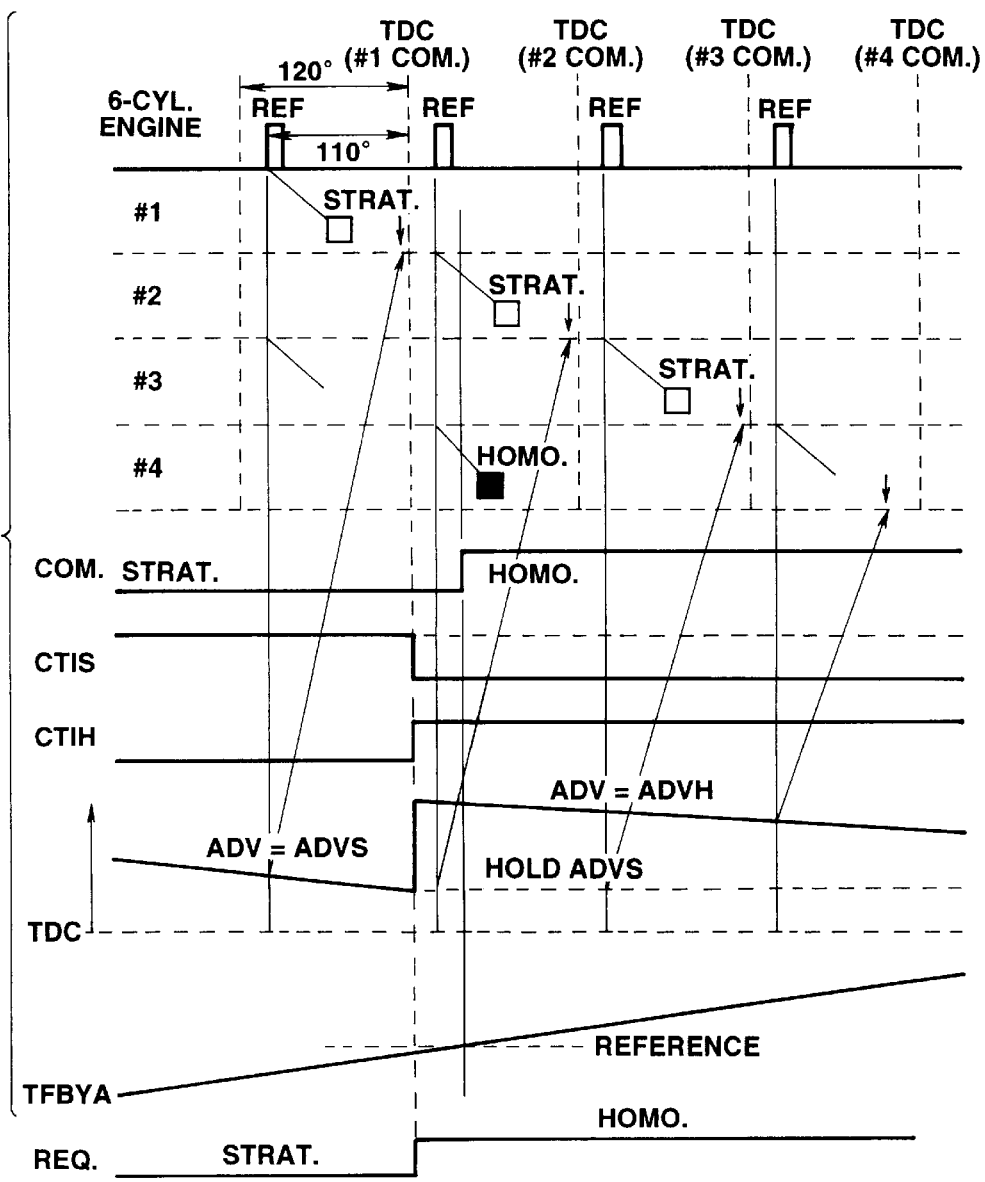
FIG. 8 is a time chart illustrating a switch from stratified charge combustion to homogeneous charge combustion.
Figure 9:
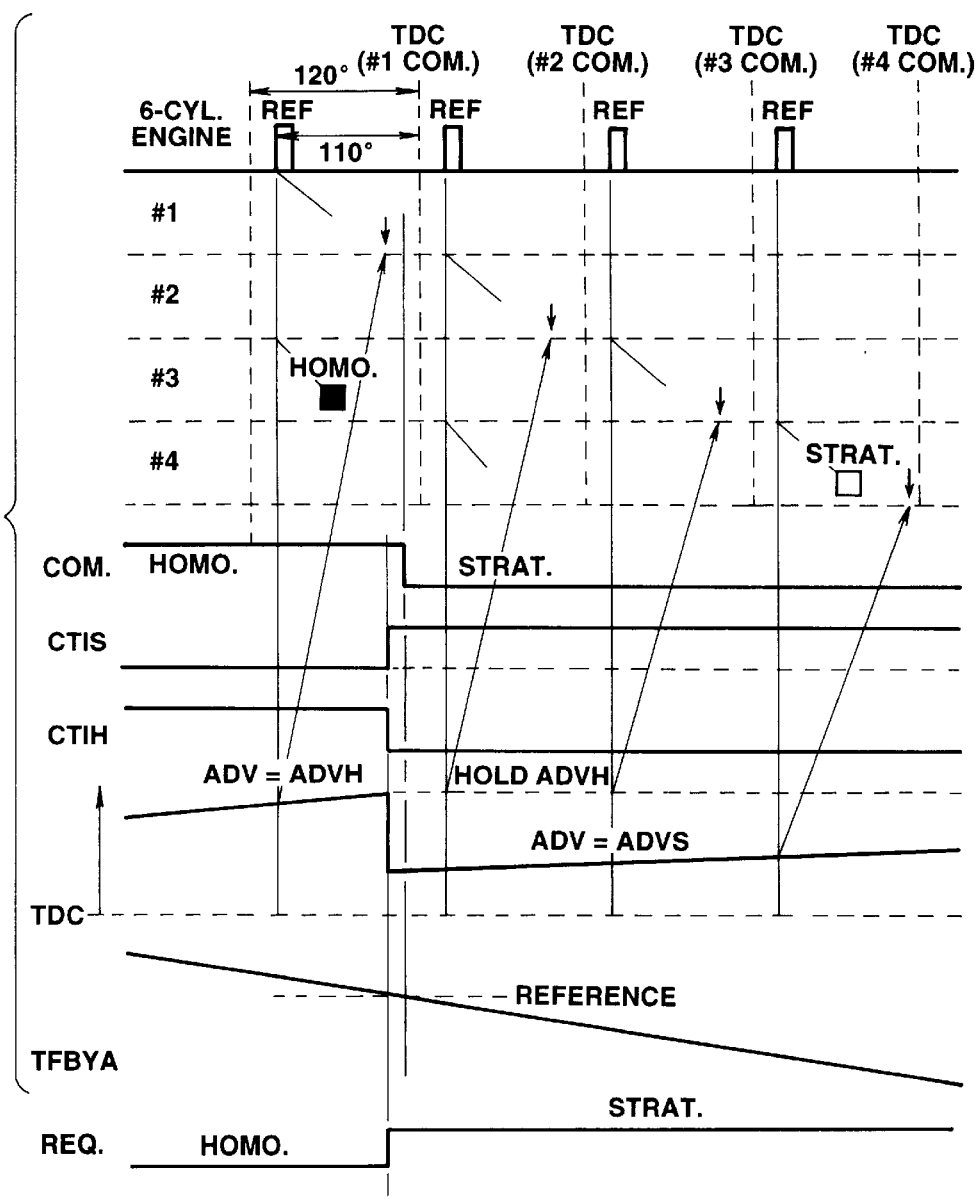
FIG. 9 is a time chart illustrating a switch from homogeneous charge combustion to stratified charge combustion.
Figure 10:
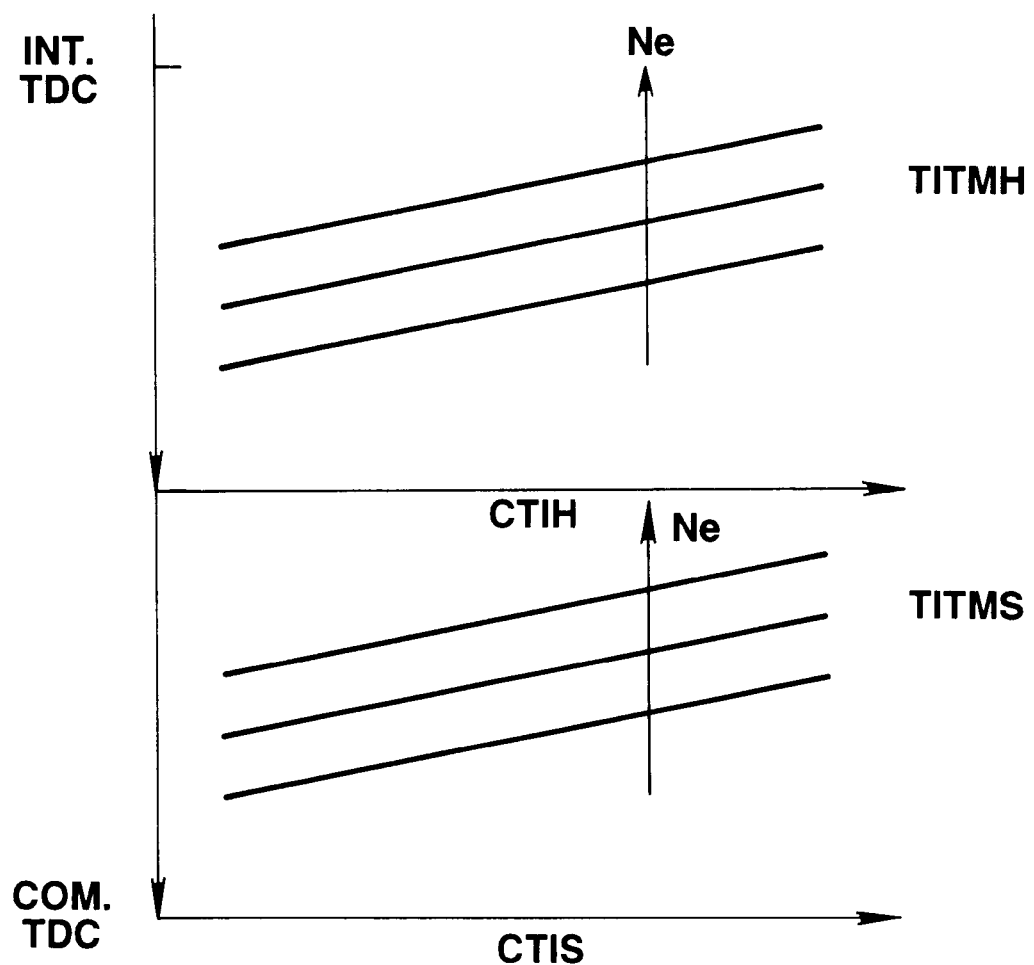
FIG. 10 illustrates maps, which are used for determining fuel injection timings.

The controller 32 can determine a change from command for stratified combustion to command for homogeneous combustion when the target ratio TFBYA exceeds a reference value (ref. FIG. 8). The controller 32 can determine a change from command for homogeneous combustion to command for stratified combustion when TFBYA drops below the reference (ref. FIG. 9).

At step 50, the controller 32 determines whether or not homogeneous combustion is requested.

If this is the case, i.e., the homogeneous combustion is requested, the routine proceeds from step 50 to step 52. At step 52, the controller 32 determines target equivalent ratio TFBYA for homogeneous charge combustion, and computes fuel injection quantity CTIH for homogeneous charge, which may be expressed using the determined TFBYA as, $$CTIH = Tp \times TFBYA \times \alpha + Ts \qquad (1).$$

Tp is a base fuel injection quantity for inducing the stoichiometry and expressed as, $$Tp = K \times Qa/Ne \qquad (2),$$

where: K is constant.

Alpha ($\alpha$) is an air fuel ratio feedback correction coefficient that is determined based on the output of the oxygen sensor 46. For operation with lean air fuel ratio, alpha is clamped to 1 ($\alpha=1$). Ts is a correction factor that depends on voltage of the vehicle ,battery.

At the next step 54, the controller 32 stores CTIH at TISETHn, which is a first buffer for #n cylinder (n is an integer ranging from one to the number of engine cylinders). The #n cylinder has a piston that is at a crankshaft position good degrees before fuel injection timing (TITMH) for homogeneous combustion, which is to be established during the subsequent intake stroke.

At step 56, the CPU sets a flag FHDMDn, which flag is set while homogeneous combustion is being requested for the #n cylinder. This flag FHDMDn is reset while stratified combustion is being requested for the #n cylinder.

If the interrogation at step 50 results in negative, i.e., stratified charge combustion is requested, the routine proceeds to step 58. At step 58, the controller 32 determines target equivalent ratio TFBYA for stratified charge combustion, and computes fuel injection quantity CTIS for stratified combustion, which may be expressed using the determined TFBYA as, $$CTIS = Tp \times TFBYA \times \alpha + Ts \qquad (3).$$

The equation (3) used at step 58 for computing CTIS is the same as the equation (1) used at step 52 for computing CTIH. However, the map used in the process of determining TFBYA of equation (3) is different from the map used in the process of determining TFBYA of equation (1). Air fuel ratio feedback coefficient alpha ($\alpha$) is always clamped to 1 ($\alpha=1$) for stratified combustion.

At the next step 60, the controller 32 stores CTIS at TISETSn, which is a second buffer for #n cylinder. The #n cylinder has a piston that is at a crankshaft position good degrees before fuel injection timing, which is to be established during the subsequent intake stroke for homogeneous combustion.

At step 62, the controller 32 resets the flag FHDMDn. The fact that the flag FHDMDn is reset indicates that stratified charge combustion is requested for the #n cylinder.

After step 62 or 56, the routine proceeds to steps 64 and 66.

At step 64, the controller 32 refers to a map containing various crankshaft angles of initiation of fuel injection TITMH for homogeneous combustion against varying values of CTIH and varying values of Ne (engine speed). This map may be illustrated in an upper half of FIG. 10 and contains crankshaft angles falling in a range covering an intake stroke. With the same engine speed Ne, the initiation of fuel injection TITMH advances as fuel injection quantity CTIH increases. With the same CTIH, the initiation of fuel injection TITMH advances as engine speed Ne increases, Thus, the CPU determines TITMH by performing a table look-up operation of the upper half of FIG. 10 using CTIH and Ne.

At the next step 66, the CPU refers to a map containing various crankshaft angles of initiation of fuel injection TTMS for stratified combustion against varying values of CTIS and varying values of Ne (engine speed). This map may be illustrated in a lower half of FIG. 10 and contains crankshaft angles falling in a range covering a compression stroke. With the same engine speed Ne, the initiation of fuel injection TITMS advances as fuel injection quantity CTIS increase and Ne, s. With the same CTIS, the initiation of fuel injection TITMS advances as engine speed Ne increases, Thus, the CPU determines TITMS by performing a table look-up operation of the lower half of FIG. 10 using CTIS and Ne.

The control routine of FIG. 2 reveals that CTIS is not computed after request change to homogeneous combustion, and the fuel injection quantity for the homogeneous charge combustion CTIH is not computed after request change to stratified combustion. This has shortened time required for computation.

It also reveals that both TITMH and TITMS for homogeneous and stratified charge combustion are always determined for smooth shift from homogeneous to stratified combustion and vice versa.

After request change to stratified combustion, CTIH is held at the last updated value and ttrls held value is used to perform table look-up operation at step 64. After request change to homogeneous combustion, CTIS is held at the last updated value and this held value is used to perform table look-up operation at step 66.

Figure 3:
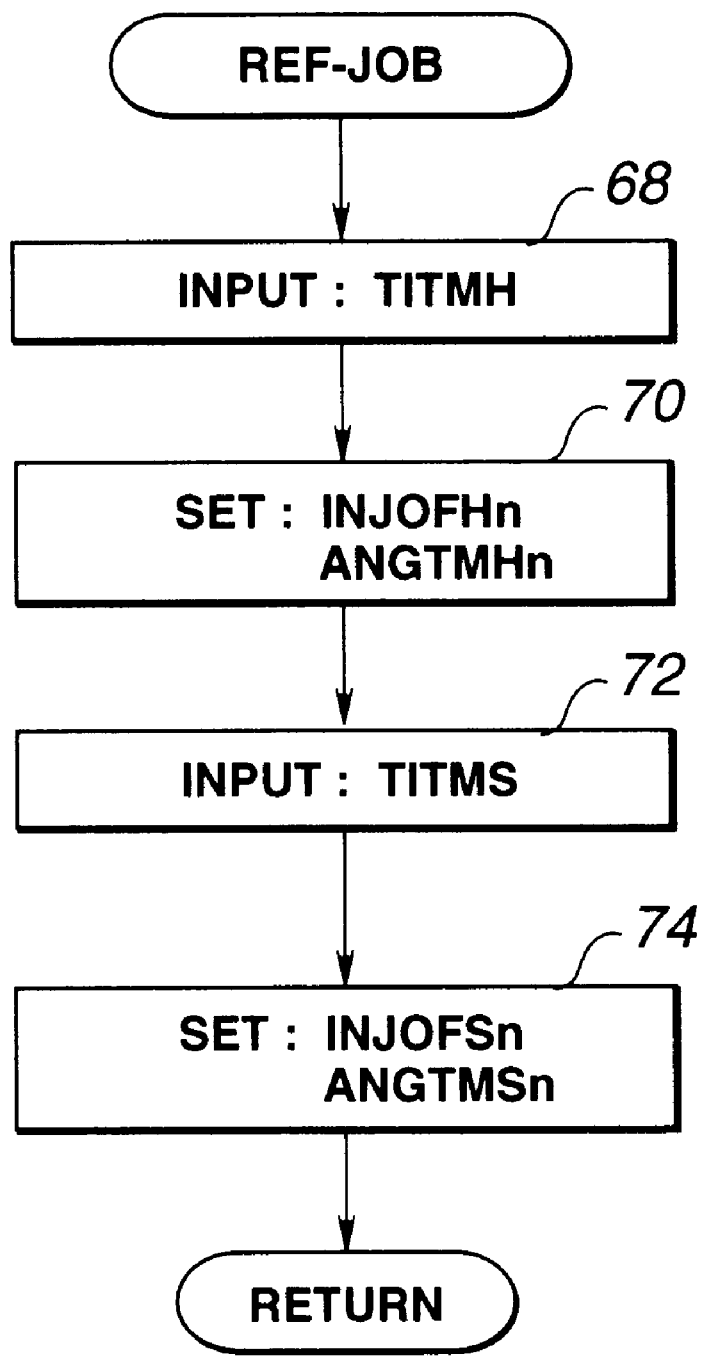
FIG. 3 is a flowchart illustrating a control routine for setting fuel injection timings TITMH and TRTMS.

FIG. 3 illustrates a control routine for setting fuel injection timings TITMH and TITMS. This routine is a REF job, so that the execution is initiated upon occurrence of a REF pulse.

In FIG. 3, at step 68, the controller 32 inputs TITMH.

At the next step 70, using the input TITMH, the controller 32 computes, for individual cylinders, the number of REF pulses to be counted INJOFHn in advance of fuel injection timing within intake stroke, and stores the result at its counter. It also computes, for individual cylinders, the number of POS pulses ANGTMHn to be counted after the last REF pulse has been counted in advance of the fuel injection timing for homogeneous combustion, and stores the result at its counter.

At step 72, the controller 32 inputs TITMS.

At the next step 74, using the input TITMS, the controller 32 computes, for individual cylinders, the number of REF pulses to be counted INJOFSn in advance of fuel injection timing within compression stroke, and stores the result at its counter. It also computes, for individual cylinders, the number of POS pulses ANGTMSn to be counted after the last REF pulse has been counted in advance of the fuel injection timing for stratified combustion, and stores the result at its counter.

With regard to TITMH and TITMS, both of them are always computed and then set for smooth switch between homogeneous and stratified charge combustion.

Detection of a REF pulse decreases, by one, the counters for INJOFHn and INJOFSn. After these counters have decreased to zero, detection of a POS pulse decreases, by one, the corresponding counters for ANGTMHn and ANGTMSn, respectively.

Figure 4:
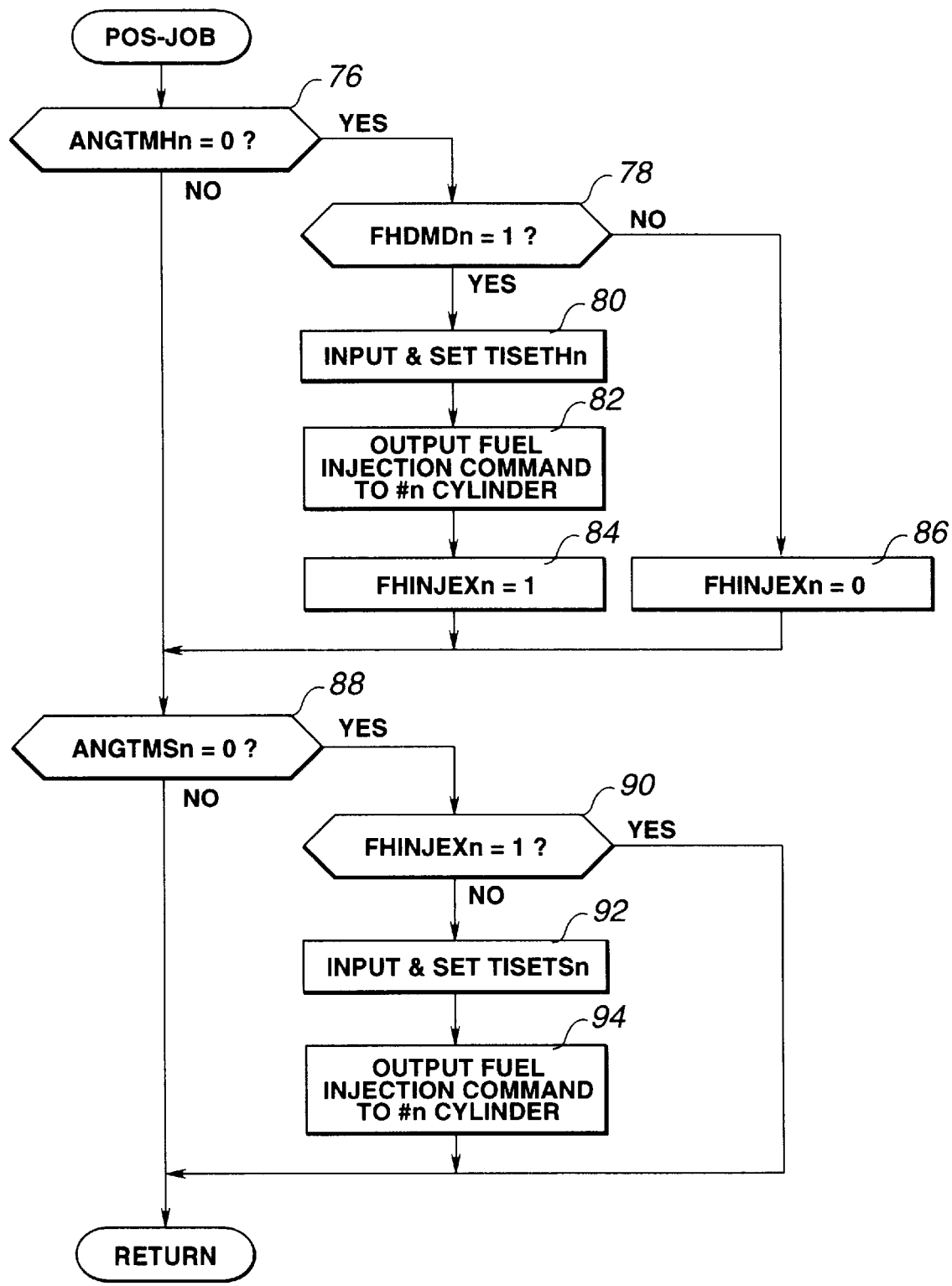
FIG. 4 is a flowchart illustrating a control routine for controlling fuel injection.

FIG. 4 illustrates a control routine for controlling fuel injection. This control routine is a POS job, so that execution of this routine is initiated upon occurrence of a POS pulse.

At step 76, the controller 32 determines whether or not the counter for ANGTMHn of #n cylinder is zero. If this is the case, the routine proceeds to step 78. At step 78, the controller 32 determines whether or not the flag for homogeneous combustion command FHDMDn of #n cylinder is equal to one. If this is the case, the routine proceeds to step 80. At step 80, the controller 32 inputs and sets TISETHn for #n cylinder. At the next stop 82, the controller 32 output fuel injection command, in terms of a pulse width of fuel injection pulse corresponding to TISETHn, to the fuel injector 20 for #n cylinder. At the next step 84, the controller 32 sets a flag FHINJEXn.

If the interrogation at step 78 results in negative, the routine proceeds to step 86. At step 86, the controller 32 resets the flag FHINJEXn.

If the interrogation at step 76 results in negative, the routine proceeds from step 76 to step 88. The routine proceeds to step 88 after step 84 or 86. At step 88, the controller 32 determines whether or not the counter for ANGTMSn for #n cylinder is zero. If this is the case, the routine proceeds to step 90. At step 90, the controller 32 determines whether or not the flag FHINJEXn is set. If this is the case, the routine is completed. In this case, fuel injection for stratified combustion will not be carried out to avoid dual fuel injections.

If the interrogation at step 90 results in negative, the routine proceeds to step 92. At step 92, the controller 32 inputs and sets TISETSn for #n cylinder. At the next step 94, the controller 32 outputs fuel injection command, in terms of a pulse width of fuel injection pulse corresponding to TISETSn, to the fuel injector 20 for #n cylinder.

From the preceding description, it is understood that, for individual cylinders, both fuel injection timings for homogeneous combustion and for stratified combustion are established. At the fuel injection timing for homogeneous combustion in an cylinder (ANGTMHn=0), the injection of the fuel quantity for homogeneous combustion is carried out only when there is request for homogeneous combustion (FHDMDn=1) for #n cylinder. Subsequently at the fuel injection timing for stratified combustion in #n cylinder (ANGTMSn=0), the injection of the fuel quantity for stratified combustion is carried out only when the injection of the fuel quantity for homogeneous combustion has not been carried out (FHINJEXn=0).

Referring to FIG. 2, what is performed at step 50 is considered to determine which one of two available combustion events is requested. What are performed at steps 52, 54, 56, 58, 60, 62, 64, and 66 of the routine of FIG. 2, all the steps of the routine of FIG. 3, and all the steps of the routine of FIG. 4 are considered to establish fuel injection scheme for individual cylinders. Specifically, what are performed at step 64 in FIG. 2, and steps 68 and 70 in FIG. 3 are considered to establish fuel injection timing for homogeneous combustion. What are performed at step 66 in FIG. 2, and steps 72 and 74 in FIG. 3 are considered to establish fuel injection timing for stratified combustion. What is performed at step 52 in FIG. 2 is considered to compute fuel injection quantity for homogeneous combustion. What is performed at step 58 in FIG. 2 is considered to compute fuel injection quantity for stratified combustion. Lastly, what is performed at step 50 in FIG. 2 is considered to switch between computation of fuel injection quantity for homogeneous combustion and that for stratified combustion.

Figure 5:
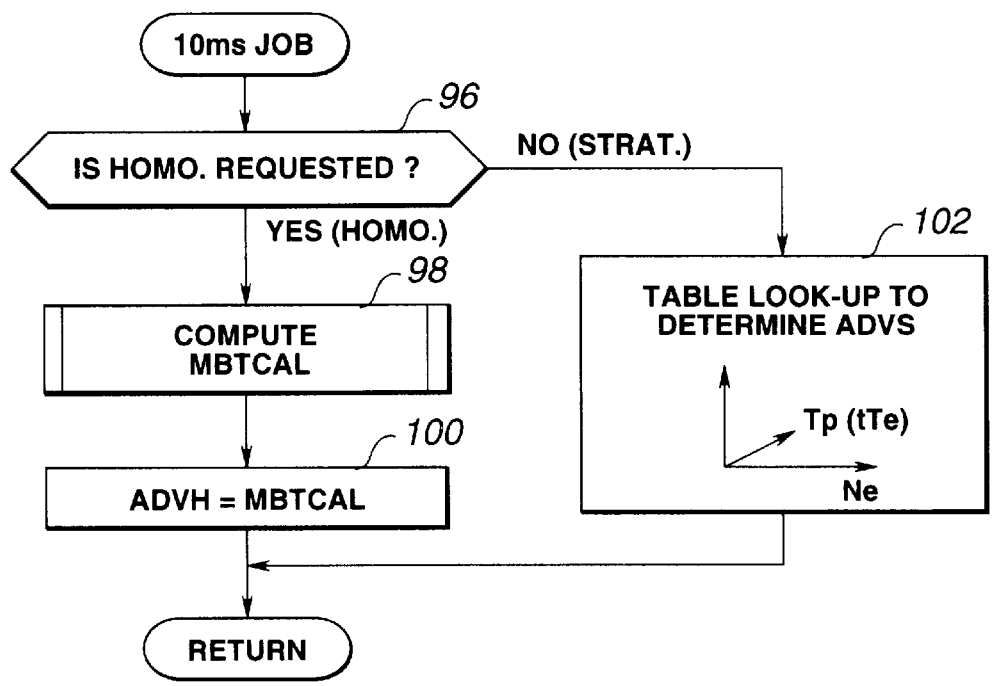
FIG. 5 is a flowchart illustrating a control routine for determining spark advances ADVH and ADVS.

FIG. 5 illustrates a control routine for determining a spark advance ADVH for homogeneous combustion and a spark advance ADVS for stratified combustion. This routine is a 10 ms job, so that the routine is executed at intervals of 10 milliseconds.

At step 96, the controller 32 determines whether or not homogeneous charge combustion is requested.

If this is the case, the routine proceeds along steps 98 and 100 for computation of spark advance ADVH for homogeneous combustion. Specifically, at step 98, the controller 32 determines MBTCAL by executing subroutine shown in FIG. 11, At the next step 1001 the controller 32 stores MBTCAL at ADVH.

If there is request for stratified combustion, the interrogation at step 96 results in negative, and the routine proceeds to step 102 for determination of spark advance ADVS for stratified combustion. At step 102, the controller 32 performs a table look-up operation using, as engine parameters, engine speed Ne and base fuel injection quantity Tp (or target engine torque tTe) to determine spark advance to ADVS. This map contains various values of ADVS against various combinations of Ne and Tp (or tTe). Comparing ADVS with ADVH reveals that, with the same combination of Ne and Tp (or tTe), ADVS is less advanced than ADVH.

The control routine of FIG. 5 reveals that ADVS is not updated when there is request for homogeneous combustion, and ADVH is not updated when there is request for stratified combustion. This has shortened time required for computation.

Figure 6:
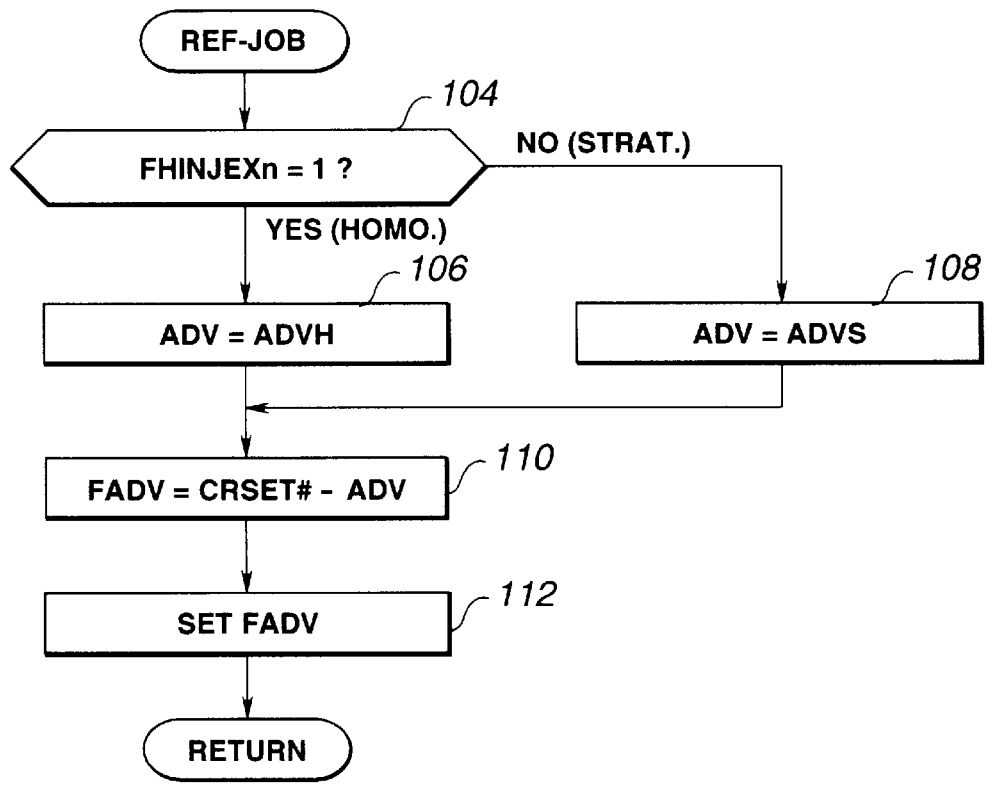
FIG. 6 is a flowchart illustrating a control routine for setting FADV.

FIG. 6 illustrates a control routine for setting FADV. This routine is a REF job, so that execution of the routine is initiated upon occurrence of a REF pulse.

At step 104, the controller 32 determines whether or not the flag FHINJEXn for #n cylinder that is to be ignited is set.

If this is the case (FEINJEXn=1), the routine proceeds to step 106. At step 106, the controller 32 stores ADVH at ADV.

If the interrogation at step 104 results in negative (FHINJEXn=0), the routine proceeds to step 108. At step 108, the controller 32 stores ADVS at ADV.

After step 106 or 108, the routine proceeds to step 110.

At step 110, the controller 32 determines an interval FADV between a REF pulse 100 degrees before compression top dead center (TDC) and the ignition timing by computing an equation as follows, $$FADV = CRSET\# - ADV \tag{4}$$

where: CRSET# indicates degrees of crankshaft angle between compression TDC and a REF pulse immediately before the compression TDC (in this embodiment, 110 degrees BTDC); and
ADV indicates degrees of crankshaft angle between the compression TDC and a crankshaft angle position at which a spark is to be produced.

At the next step 112, the controller 32 sets FADV to a counter therefor.

Detection of a POS pulse decreases the content of the counter for FADV.

Figure 7:
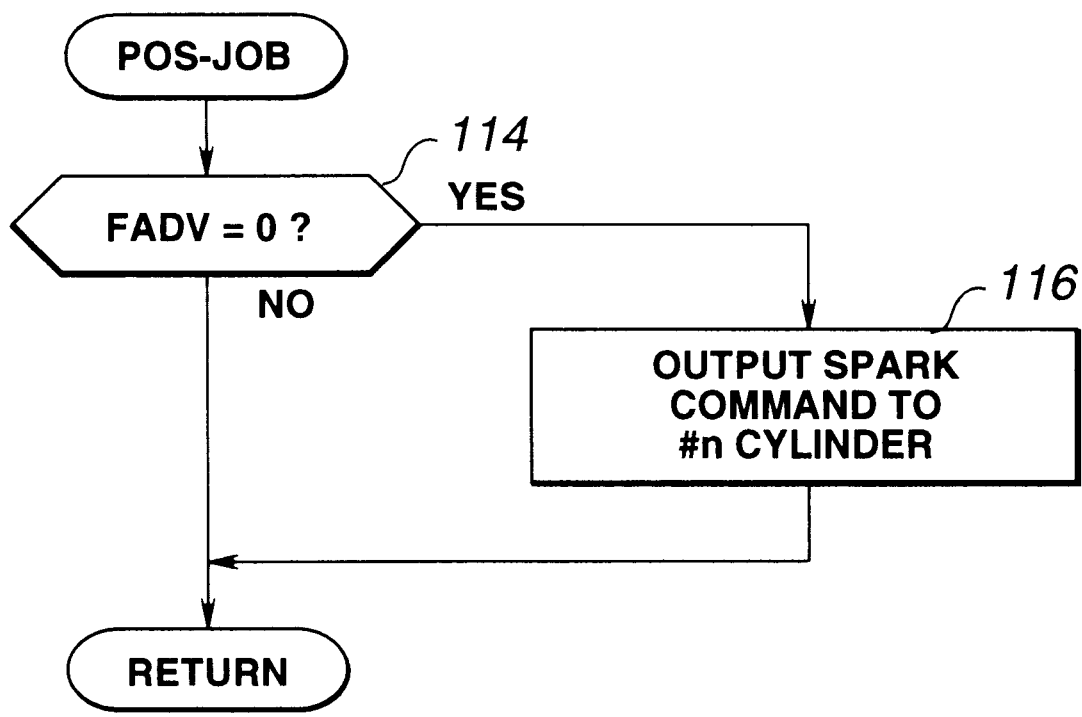
FIG. 7 is a flowchart illustrating a control routine for controlling a spark.

FIG. 7 illustrates a control routine for controlling a spark. This routine is a POS job, so that execution of this routine is initiated upon occurrence of a POS pulse.

At step 114, the controller 32 determines whether or not the counter for FADV has decreased to zero. If this is the case, the routin e proce eds to step 116. At step 116, the controller 32 outputs spark command to #n cylinder.

What is performed at step 96 in FIG. 5 is considered to determine which one of available two combustion events is requested. What are performed at steps 98, 100, and 102 in FIG. 5, at all the steps in FIG. 6, and at all the steps in FIG. 7 are considered to establish, for individual cylinders, ignition timings, Specifically, what are performed at steps 98 and 100 in FIG. 5 are considered to compute ignition timing for homogeneous combustion. What is performed at step 102 in FIG. 5 is considered to compute ignition timing for stratified combustion. What is performed at step 96 in FIG. 5 is considered to switch between computation of ignition timing for homogeneous combustion and computation of ignition timing for stratified combustion.

Referring to FIGS. 8 and 9, a transient state from stratified combustion to homogenous combustion and a transient state from homogeneous combustion to stratified combustion are explained. In each of FIGS. 8 atpd 9, the transient state with regard to #1 to #4 cylinders, in the firing order, of six-cylinder engine is illustrated.

FIG. 8 illustrates a transient state from stratified combustion to homogeneous combustion.

Immediately after the controller 32 has determined the request change to homogeneous combustion, a switch from stratified combustion to homogeneous combustion is initiated from #4 cylinder whose piston is immediately before the spark timing for homogeneous combustion, which stays in intake stroke.

At moment, upon determination of the request change to homogeneous combustion, the fuel injection quantity CTIH for homogeneous combustion is computed. Upon completion of such computation, request for homogeneous combustion (FHDMDn=1) is set first of all to #4 cylinder whose piston is immediately before the spark timing for homogeneous combustion, and then to the other cylinders in the firing order.

At this moment, with regard to #4 cylinder, both the fuel injection timings TITMH and TITMS for homogeneous and stratified combustion, respectively, were set at occurrence a REF pulse immediately before, and the counter for injection timing for homogeneous combustion ANGTMHn is being decreased. When the counter for ANGTMHn has decreased to zero, the request for homogeneous combustion (FHDMDn=1) is found and the fuel injection for homogeneous combustion is carried out.

With regard to #4 cylinder, the fuel injection timing for stratified combustion TITMS has been set, and the counter for injection timing ANGTMSn is being decreased. Subsequently when this counter decreases to zero, the fuel injection for homogeneous combustion has been executed (FHINJEXn=1) and thus the fuel injection for stratified combustion will not be executed.

With regard to spark ignition control, at the moment upon determination of request change to homogeneous combustion, spark advance ADVH for homogeneous combustion is computed. Upon detection of a REF pulse immediately before ignition timing for #4 cylinder, it is determined whether or not the fuel injection for homogeneous combustion has been executed (FHINJEXn=1). As this fuel injection has been executed, the ignition timing ADV is set equal to spark advance ADVH for homogeneous combustion.

With regard to #3 cylinder that is the last to perform stratified combustion, upon determination of request change to homogeneous combustion, the piston within this cylinder has past the injection timing for homogeneous combustion, so that request for homogeneous combustion for #3 cylinder is reset (FHDMDn=0). Thus, subsequently when the counter for fuel injection for stratified combustion (ANGTMSn) has decreased to zero, the fuel injection for stratified combustion is executed. Since the fuel injection quantity for stratified combustion CTIS has not been newly computed, the last value of CTIS that was computed is held for use in this fuel injection.

With regard to spark ignition for #3 cylinder, upon detection of a REF pulse that is immediately before the spark timing, it is determined whether or not the fuel injection for homogeneous combustion has been executed (FHINJEXn=1). The fuel injection for homogeneous combustion has not been executed, so that the spark timing ADV is set equal to the ignition timing for stratified combustion ADVS for the ignition timing control. Since the spark advance for stratified combustion ADVS has not been newly computed, the last value of ADVS that was computed is held for use in this spark ignition.

FIG. 9 illustrates a transient state from homogeneous combustion to stratified combustion.

Immediately after the controller 32 has determined the request change to stratified combustion, a switch from homogeneous combustion to stratified combustion is initiated from #4 cylinder whose piston is immediately before the injection timing for homogeneous combustion, which stays in intake stroke.

At moment, upon determination of the request change to stratified combustion, the fuel injection quantity CTIS for stratified combustion is computed. Upon completion of such computation, request for stratified combustion (FHDMDn=0) is set first of all to #4 cylinder whose piston is immediately before the injection timing for homogeneous combustion, and then to the other cylinders in the firing order.

At this moment, with regard to #4 cylinder, both the fuel injection timings TITMH and TITMS for homogeneous and stratified combustion, respectively, were set at occurrence of a REF pulse immediately before, and the counter for injection timing for homogeneous combustion ANGTMHn is being decreased. When the counter for ANGTMHn has decreased to zero, it is determined whether or not there is request for homogeneous combustion (FHDMDn=1) for #4 cylinder. Since there is stratified combustion request (FHDNDn=0), the fuel injection for homogeneous combustion is not carried out.

With regard to #4 cylinder, the fuel injection timing for stratified combustion TITMS has been set, and the counter for injection timing ANGTMSn is being decreased. Subsequently when this counter decreases to zero, the fuel injection for homogeneous combustion has not been executed (FHINJEXn) (=0) and thus the fuel injection for stratified combustion will be executed.

With regard to spark ignition control, at the moment upon determination of request change to stratified combustion, spark advance ADVS for stratified combustion is computed. Upon detection of a REF pulse immediately before ignition timing for #4 cylinder, it is determined whether or not the fuel injection for homogeneous combustion has been executed (FHINJEXn=1). As this fuel injection has not been executed, the ignition timing ADV is set equal to spark advance ADVS for stratified combustion.

With regard to #3 cylinder that is the last to perform homogeneous combustion, upon determination of request change to stratified combustion, the piston within this cylinder has past the injection timing for homogeneous combustion, and the fuel injection for homogeneous combustion has been executed. Thus, subsequently when the counter for fuel injection for stratified combustion (ANGTMSn) has decreased to zero, the fuel injection for stratified combustion is not executed because the fuel injection for homogeneous combustion has been executed (FHINJEXn=1).

With regard to spark ignition for #3 cylinder, upon detection of a REF pulse that is immediately before the ignition timing, it is determined whether or not the fuel injection for homogeneous combustion has been executed (FHINJEXn=1). The fuel injection for homogeneous combustion has been executed, so that the ignition timing ADV is set equal to the ignition timing for homogeneous combustion ADVH for the ignition timing control. Since the spark advance ADVH for homogeneous combustion has not been newly computed, the last value of APVH that was computed is held for use in this spark ignition.

Figure 11:
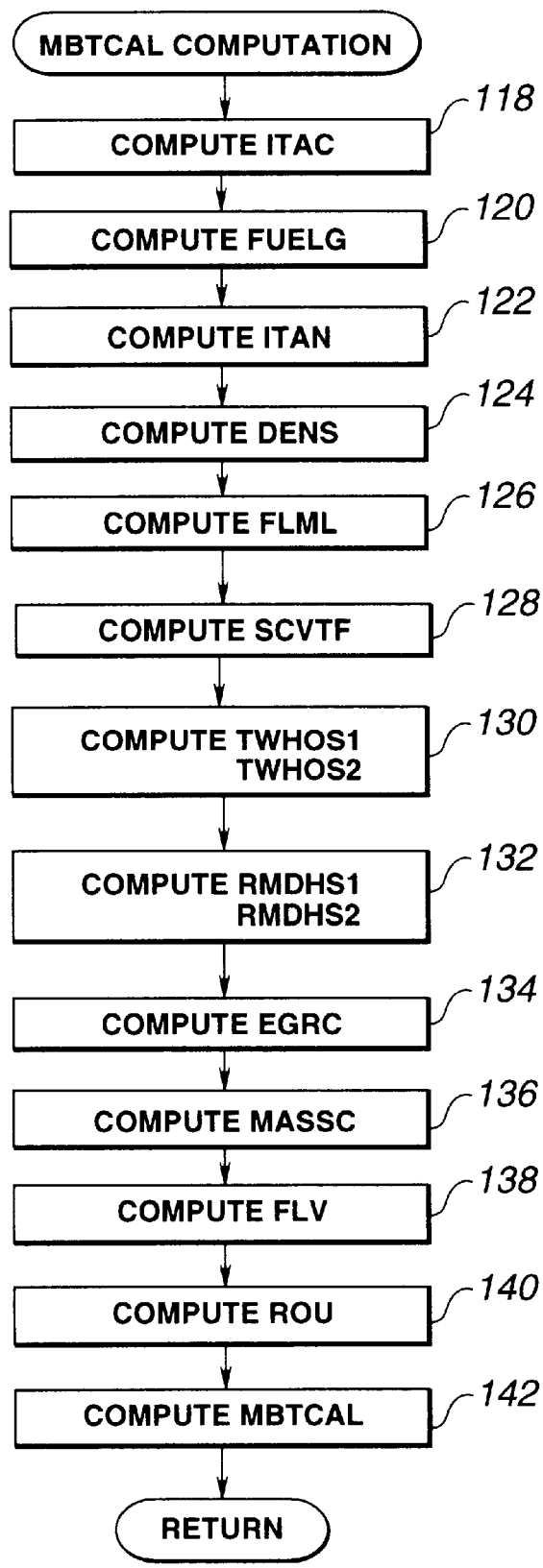
FIG. 11 is a flowchart illustrating a subroutine for computing MBTCAL.

FIG. 11 illustrates a subroutine for computing MBT to give MBTCAL. This manner of computing MBTCAL is proposed in Japanese Patent Applications Nos. 8-183637 filed Jul. 12, 1995 (now published as JP-A 10-30535) and 8-238784 filed Sep. 10, 1996, which have been incorporated herein in their entirety by reference.

At step 118, the controller 32 determines a piston filling-up coefficient ITAC by computing the following equation, $$ITAC = Tp/Tp100 \quad (5)$$

where: Tp is base fuel injection quantity that corresponds to intake air quantity admitted to cylinder; and
Tp100 is a fixed value of the base fuel injection quantity that corresponds to intake air quantity admitted to the cylinder if the cylinder filling-up efficiency is 100%.

At step 120, the controller 32 determines a fuel weight equivalent coefficient FUELG by calculating the following equation, $$FUELG = TFBYA/14.6 \quad (6)$$

where: TFBYA is target equivalent ratio (TFBYA=14.6/tAF).

In the case of the stoichiometry, for example, FUFLG= 1.0/14.6, so that FUFLG takes a smaller value in the case of lean A/F.

At step 122, the controller 32 determines a fresh air proportion ITAN that is ex-pressed as, $$ITAN=(G_{AIR}+G_{REG})/G_{AIR} \qquad (7)$$

where: $G_{AIR}$ is weight of fresh air within cylinder, $G_{REG}$ is weight of residual gas within cyihnder, and
($G_{AIR}+G_{REG}$) is weight of gas within cylinder.

In determining ITAN, the controller 32 performs a table look-up of ITAN map using ITAC and Ne. The ITAN map contains various value of ITAN against various combinations of ITAC and Ne.

At step 124, the controller 32 determines unburned gas density base value DENSE by performing a table look-up operation of IENSE map using ITAC. The DENSE map contains various values of DENSE against various values of ITAC. A value of DENSE increases as ITAC increases.

At step 126, the controller 32 determines laminar flow flame velocity base FLML by performing a table lookup operation of FLML map using ITAC and Ne. The FLML map contains various value of FLML against various combinations of values of ITAC and values of Ne. The laminar flow flame velocity is flame propagation speed through gas that is stationary, which is a speed at which flame propagates through gas that has no dynamic flow or disturbance. With the same Ne, FLML increase, as ITAC increases. With the same ITAC, FLML increases as Ne increases.

At step 128, the controller 32 determines swirl control valve opening degree coefficient SCADMP by performing a table look-up operation of a predetermined map using swirl control valve opening degree. Using the swirl control valve opening degree coefficient SCADMP, the controller 32 determines a swirl correction coefficient SCVTF by computing the following equation, $$SCVTF=SCADMP \times SCVK+1.0 \qquad (8)$$

where: SCVK is appropriate coefficient.

This swirl correction coefficient SCVTF is indictive of rate at which flame velocity increases owing to increase in disturbance us the swirl control valve closes toward its fully closed position. This coefficient SCVTF is determined by the degree with which the swirl control valve opens. It takes a value of 0 when the swirl control valve is fully opened and a value of 1 when the swirl control valve is fully closed. For the valve openings between the fully opened position and the fully closed position, values determined through linear interpolation technique are allocated to SCVTF. The coefficient SCVK is determined by the configuration of intake ports of an engine, and thus takes different values for different configurations of intake ports.

At step 130, the controller 32 determines coolant temperature correction coefficients TWHOS1 and TWHOS2 by performirng table look-up operation of predetermined different tables using coolant temperature Tw.

At step 32, the controller 32 determines equivalent ratio correction coefficients RMDHS1 and RMDHS2 by performinng table look-up operation of predetermined different tables using target equivalent ratio TFBYA.

At step 134, the controller 32 determines preset Exhaust Gas Recirculation rate (EGR rate) RATEGR by performing a predetermined map using ITAC and Ne. RATEGR is defined as a ratio (EGR gas flow rate)/[(fresh intake airflow rate)+(EGR gas flow rate)]. Next, the controller 32 uses this RATEGR to determine correct EGR value EGRC by computing the following equation, $$EGRC=RATEGR \times HK \qquad (9)$$

where: HK is a correction coefficient (constant) to adjust the present EGR rate to actual EGR rate. The correction coefficient HK takes different values from one type of engines to another type.

At step 136, the controller 32 determines total mass of gas within cylinder MASSC that is expressed in terms of mass of gas per unit volume of cylinder by computing the following equation, $$MASSC = ITAC \times [1 + EGRC + FUELG + (1 - ITAN)/ITAN]. \qquad (10)$$

In the right side of this equation (10), the second term, the third term, and the fourth term are added to take into consideration of influence of EGR, A/F and residual gas upon total mass of gas within cylinder.

At step 138, using FLML, RMDHS2, TWHOS2, and SCVTF, the controller 32 determines flame propagation speed FLV by calculating the following equation, $$FLV=FLML \times RMDHS2 \times TWHOS2 \times (1-A2 \times EGR0)+FLMT \times SCVTF \times A3 \qquad (11),$$

where: A2 is flame propagation velocity correction coefficient,
A3 is flame propagation velocity correction coefficient,
EGR0 is EGR correction coefficient, and
FLMT is turbulent flow flame propagation velocity base value (fixed value).

In the right side of this equation (11), the first term, i.e., [FLML×RMDHS2×TWHOS2×(1−A2×EGR0)], expresses flame propagation velocity when there is no swirl, and the second term, i.e., [FLMT×SCVTF×A3], expresses increase of flame propagation velocity owing to swirl.

In the first term, RMDHS2 is determined to take into account influence of air fuel ratio (target equivalent ratio TFBYA) upon laminar flow flame propagation velocity, and TWHOS2 is determined to take into account influence of coolant temperature Tw upon laminar flow propagation vtelocity.

In the fist term, EGR0 is a value, which is required to reflect phenomenon that conducting EGR causes decrease in flame propagation velocity EGR0 is derived from preset EGR rate RATEGR and fresh air proportion ITAN. Coefficient A is constant that is adjusted to one type of engines after another type.

In the second term, turbulence propagation velocity basic value FLMT is a value (fixed value) that is determined after conducting Fishhook experiment with the swirl control valve held at its fully closed position. Accordingly, when the swirl control valve is at an opening degree between the fully closed position and the fully opened position, FLMT is decreased by swirl correction coefficient SCVTF. Coefficient A3 is a value proportional to Ne. At step 140, the controller 32 determines unburned gas density ROU using unburned gas density base value DENS, equivalent ratio correction coefficient RMDHS1, and coolant temperature correction coefficient TWHOS1 by computing the following equation, $$ROU=DENS \times RMDHS1 \times TWHOS1 \qquad (12)$$

In this equation (12), TWHOS1 is determined after taking into account influence of coolant temperature Tw upon unburned gas density ROU, and RMDHS1 is determnined after taking into account influence of air fuel ratio (target equivalent ratio TFBYA) upon ROU.

After computing MASSC (at step 136), FLV (at step 138), and ROU (unburned gas density), the routine proceeds to step 142. At step 142, the controller 32 determines MBTCAL [°BTDC] by computing the following equation, $$MBTCAL = [B1 + A1 \times MASSC/(ROU \times FLV)] \times B2 - B3 \quad (13)$$

where: B1 is ignition lag,
B2 is conversion variable from time interval to crankshaft angle, and
B3 is crankshaft angle correction coefficient for computation of MBTCAL.

A1 is expressed by the equation that $A1 = \rho 0 \times Vcyl$ (where: $\rho 0$ is standard air density, and Vcyl is swept volume by cylinder.). Thus, A1×MASSC is total weight of air within cylinder.

MBT stands for ignition timing, at which spark is produced to initiate combustion of combustible charge whose pressure within cylinder has the maximum at a crankshaft angle within a predetermined range from 10 degrees to 15 degrees. Conventionally, it is the usual practice to employ MBT as a basic ignition timing, and a basic ignition timing map is prepared after conducting adjustment experiment, which map contains various crankshaft angles against parameters including engine speed and load. According to this embodiment of the present invention, MBT is determined by computing the equation (13).

In the equation (13), A1×MASSC/(ROU×FLV) indicates burning time for flame to propagate through all of unburned gas within cylinder. The dimension is milliseconds [ms]. Ignition lag B1 [ms] is added to the burning time and the dimension of this result is converted by conversion variable B2 to the dimension of crankshaft angles. The result after this conversion is ignition timing indicative of MBT As this equation (13) shows, with the same flame propagation velocity FLV, the burning time becomes long as the total weight of gas within cylinder increases, so that the value of MBTCAL increases and the ignition timing advances. With the same total weight of gas within cylinder, the burning time becomes short as the flame propagation velocity FLV increases, so that the value of MBTCAL decreases and the ignition timing retards. For the same burning time, crankshaft duration varies with engine speed, and it is needed to increase MBTCAL to advance the ignition timing as engine speed increases. Thus in the equation (13), the conversion variable B2 is proportional to engine speed Ne. B1 and B2 are fixed for the same type of engines and adjusted to one type of engine after another type.

For adjustment of the basic ignition timing map to one type of engines, the conventional MBT control requires a great amount in time and number of experiments against representative combinations of engine speed and load. According to the MBT control using the equation (13), the adjustment of this equation requires experiments less in time and number, shortening time interval for development.

In addition to the advantage of shortening span for development, the MBT control using the equation (13) requires less memory space in the control unit, reducing manufacturing cost.

Referring to FIGS. 12 to 16, a second embodiment is described.

This second embodiment is substantially the same as the first embodiment. Along with this second embodiment, preferred mode of dwell angle control during transient state between stratified combustion and homogeneous combustion is explained.

Referring to FIG. 1, in the same manner as the first embodiment, a controller 32 has stored in its ROM plural maps each contain different values of base target equivalent ratio TFBYAO and request for homogeneous combustion and request for stratified combustion. The values of TFBYA and the requests are allocated against different engine operating parameters, which may be represented by such parameters as engine speed Ne and target engine torque tTe.

Figure 12:
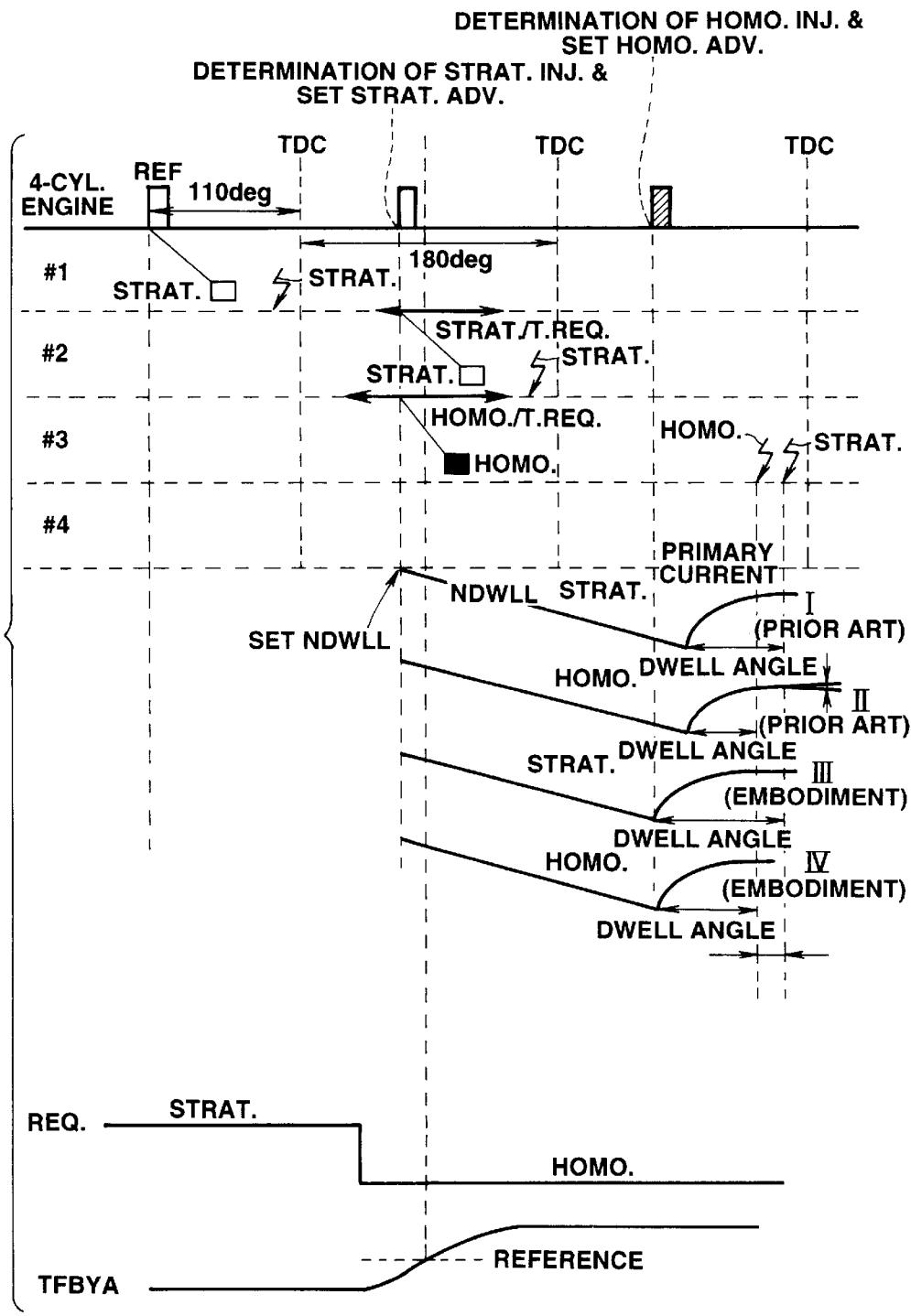
FIG. 12 is a timing chart illustrating a switch from stratified charge combustion to homogeneous charge combustion.

Referring to FIG. 12, in the same manner as the first embodiment, the base target equivalent ratio TFBYAO is obtained after table look-up operation of the appropriate map. The result is further modified with a first order delay to give a target equivalent ratio. The target equivalent ratio TFBYA is compared with the reference. The setting is such that values of equivalent ratios that may constitute the reference fall in the overlap where both homogeneous combustion and stratified combustion may take place. The target equivalent ratio TFBYA may be subjected to an increase after it exceeds the reference and to a decrease after it drops below the reference. This measure is intended to avoid undesired torque change.

The controller 32 performs a table look-up operation of the appropriate map to find which one of stratified combustion or homogeneous combustion is requested.

Figure 13:
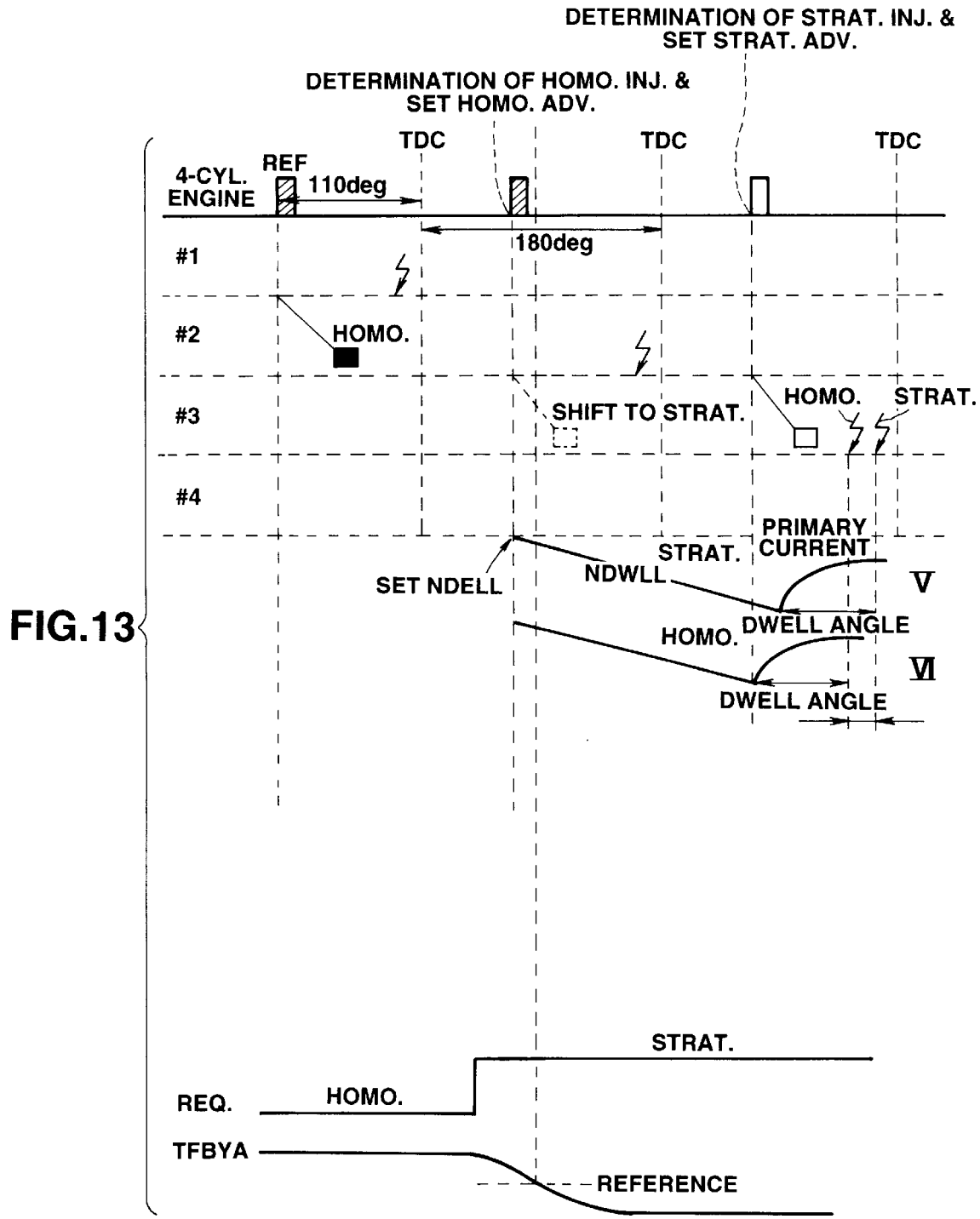
FIG. 13 is a timing chart illustrating a switch from homogeneous charge combustion to stratified charge combustion.

Referring to FIGS. 12 and 13, a transient state from stratified combustion to homogeneous combustion and a transient state from homogeneous combustion to stratified combustion are explained. In each of FIGS. 12 and 13, the transient state with respect to #1 to #4 cylinders, in the firing order of four-cylinder engine is illustrated.

FIG. 12 illustrates a transient state from stratified combustion to homogeneous combustion.

Suppose there is request change from stratified combustion to homogeneous combustion.

Upon elapse of a delay after this request change, the target equivalent ratio TFBYA exceeds the reference, and it is determined that there is a change from command for stratified combustion to command for homogeneous combustion. This change is named "command change."

Immediately after the request change to homogeneous combustion, a REF pulse is generated prior to the command change to homogeneous combustion This REF pulse is generated at a crankshaft position 110 degrees before compression TDC for #2 cylinder and thus precedes a REF pulse that is generated at a crankshaft position 110 degrees before compression TDC for #3 cylinder. Thus, fuel quantity and injection timing for stratified combustion have been set for #2 cylinder. However, with regard to #3 cylinder, fuel quantity and injection timing for homogeneous combustion may be set. Thus, stratified combustion takes place within #2 cylinder. Subsequently, homogeneous combustion takes place within the other cylinders starting with #3 cylinder.

FIG. 13 illtustrates a transient state from homogeneous combustion to stratified combustion.

Suppose there is request change from homogeneous combustion to stratified combustion.

Upon elapse of a delay after this request change, the target equivalent ratio TFBYA drops below reference, and it is determined that there is command change from homogeneous combustion to stratified combustion.

Immediately after the request change to stratified combustion, a REF pulse is generated prior to the command change to stratified combustion. This REF pulse is generated at a crankshaft position 110 degrees before compression TDC for #2 cylinder and thus precedes a REF pulse that is generated at a crankshaft position 110 degrees before compression TDC for #3 cylinder. Thus, fuel quantity and injection timing for homogeneous combustion have been set for #2 cylinder. However, with regard to #3 cylinder, fuel quantity and injection timing for stratified combustion may be set. Thus, homogeneous combustion takes place within #2 cylinder. Subsequently, stratified combustion takes place within the other cylinders starting with #3 cylinder.

Figure 14:
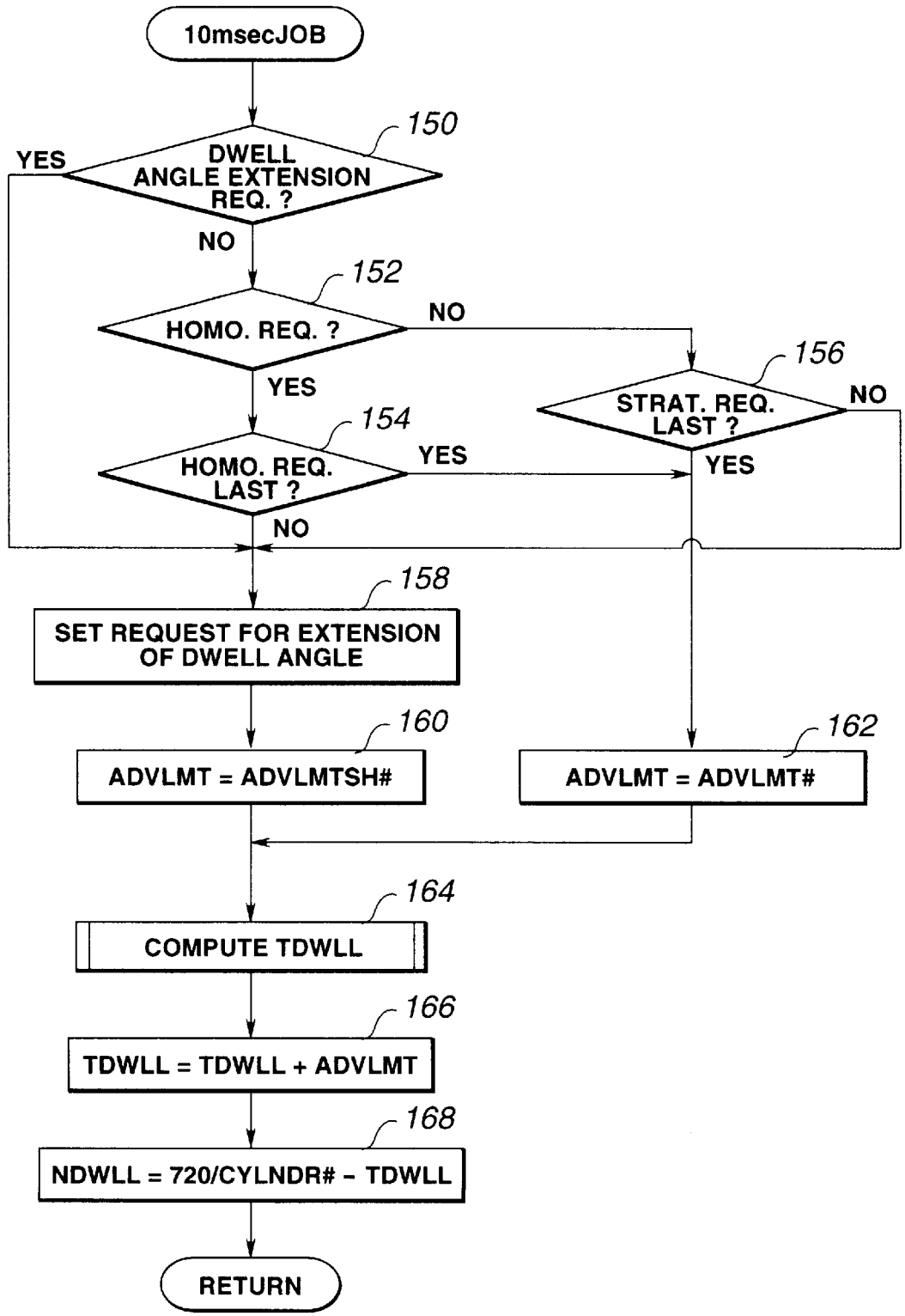
FIG. 14 is a flowchart illustrating a control routine for determining non-dwell angle NDWLL.
Figure 15:
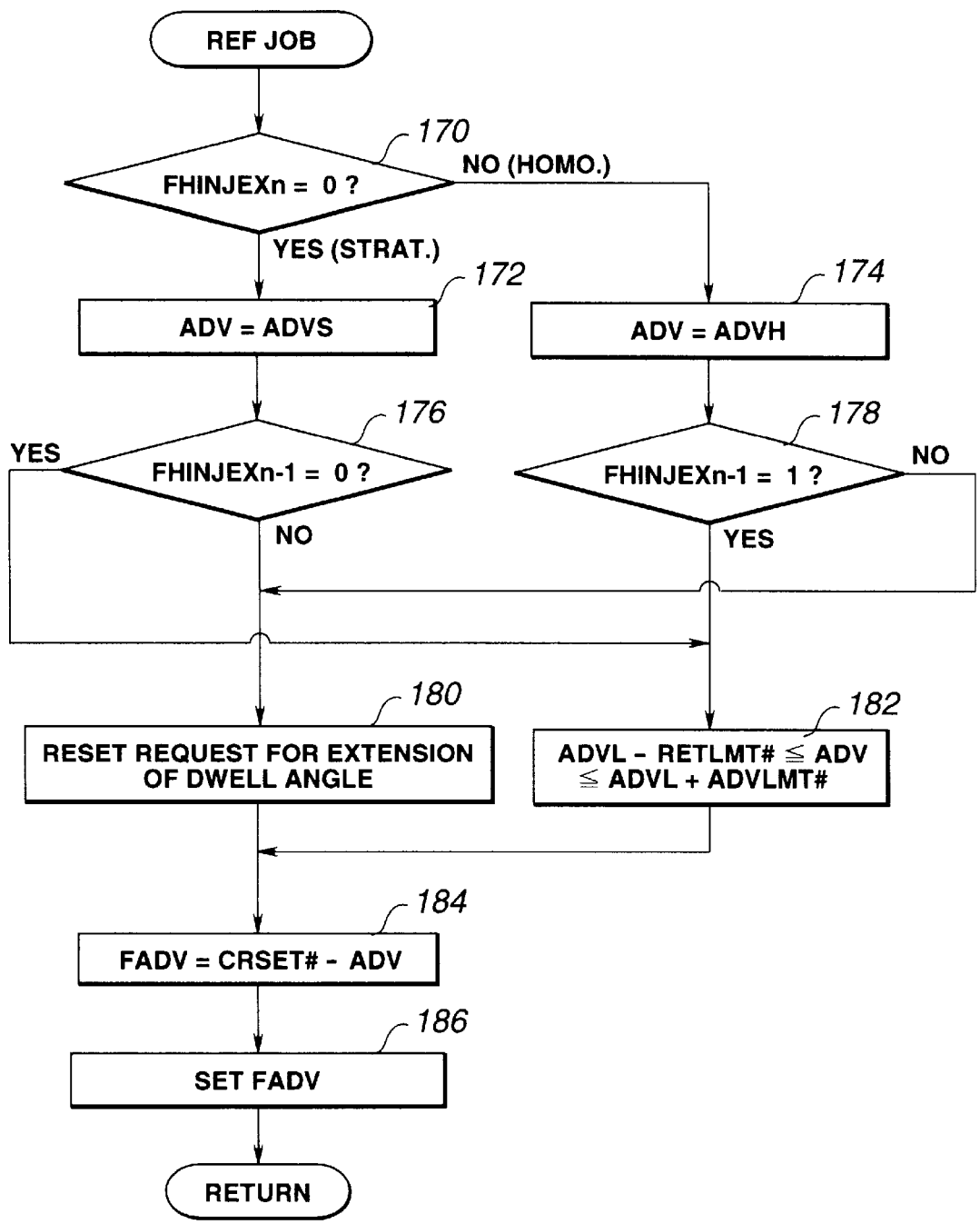
FIG. 15 is a flowchart illustrating a control routine for setting FADV.
Figure 16:
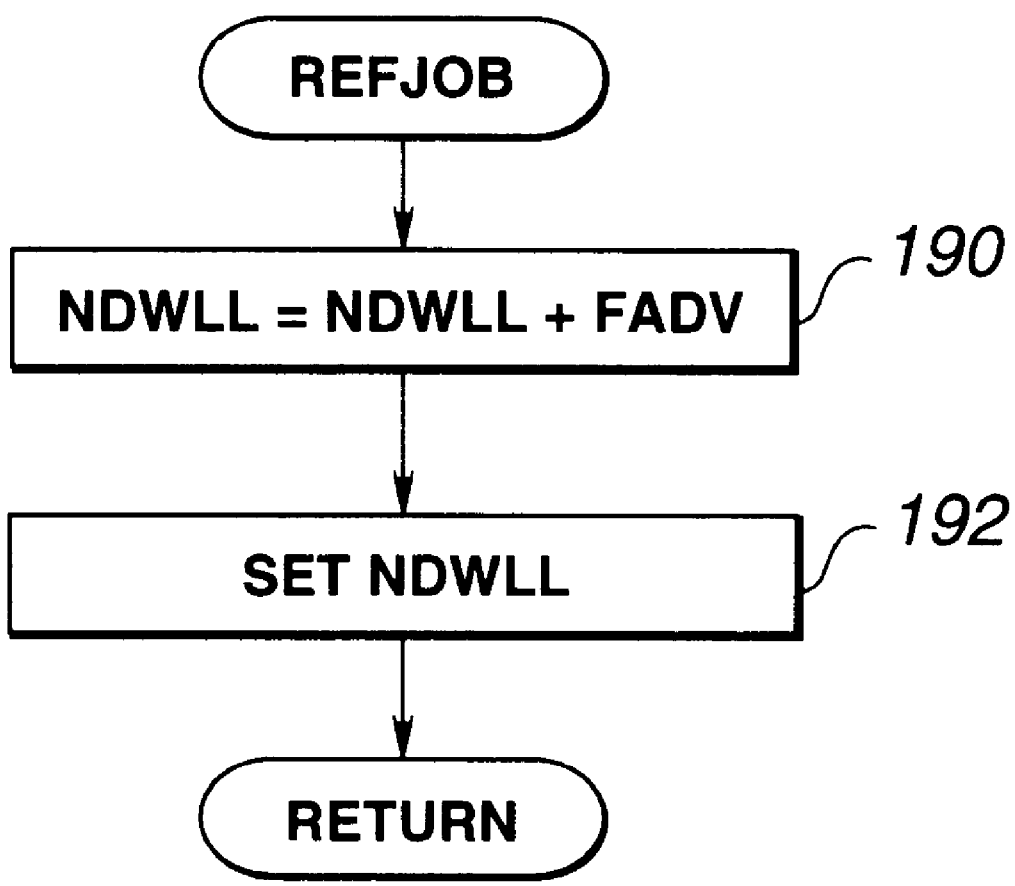
FIG. 16 is a flowchart illustrating a control routine for setting NDWLL.

Referring to FIGS. 14 to 16, a dwell angle control of an ignition coil of an ignition circuit is explained.

FIG. 14 is a flowchart of a control routine that is executed at intervals of 10 milliseconds.

In FIG. 14, at step 150, a controller 32 (see FIG. 2) determines whether or not request for extension of dwell angle is set. If the request is not set at step 150, the routine proceeds to step 152. At step 152, the controller 32 determines whether or not there is request for homogeneous combustion.

If, at step 152, there is request for homogeneous combustion, the routine proceeds to step 154. At step 154, the controller 32 determines whether or not there was request for homogeneous combustion in the last execution of this routine. Suppose there was request for stratified combustion in the last execution of the routine and there is a change to request for homogeneous combustion in current execution of the routine. In this case, the routine proceeds along steps 150, 152 and 154 to step 158. At step 158, the controller 32 sets request for extension of dwell angle.

If there is request for stratified combustion, the interrogation at step 152 results in negative and the routine proceeds from step 152 to step 156. At step 156, the controller 32 determines whether or not there was request for stratified combustion in the last execution of the routine. Suppose there was request for homogeneous combustion in the last execution of the routine and there is a change to request for stratified combustion in current execution of the routine. In this case, the routine proceeds along steps 150, 152 and 156 to step 158. At step 158, the controller 32 sets request for extension of dwell angle.

From the preceding description, it is now understood that the routine proceeds to step 158 upon or immediately after determination by the controller 32 of a change between request for stratified combustion and request for homogeneous combustion. At step 158, the controller 32 sets request for extension of dwell angle (TDWLL).

After setting the request for extension of dwell angle, the routine proceeds to step 160. At step 160, the controller 32 sets an advance limit ADVLMT of ignition timing ADV equal to an amount of advance ADVLMTSH#, for example 20 degrees, that is used during dwell angle control upon occurrence of a change between request for stratified combustion and request for homogeneous combustion.

This amount of advance ADVLMTSH# is predetermined and corresponds to amount of advance from ignition timing for stratified combustion to ignition timing for homogeneous combustion.

The amount of advance from ignition timing for stratified combustion to ignition timing for homogeneous combustion varies with variations in engine speed. Varying ADVLMTSH# with varying engine speeds reflects this correlation.

Supposing that ADVH is ignition timing for stratified combustion, ADVS is ignition timing for homogeneous combustion, and DVLMT# is ordinary advance limit, ADVLMTSH# may be expressed as, $$ADVLMTSH\# = ADVH - ADVS \geq ADVLMT\# \quad (14).$$

In this case, the ignition timings ADVH and ADVS are always being updated by computation.

Alternatively, ADVLMTSH# may be expressed as, $$ADVLMTSH\# = ADVH - ADVS + ADVLMT\# \geq ADVLMT\# \quad (15).$$

It is to be mentioned that if ADLMTSH#=ADVH−ADVS, the amount of advance is suppressed to the required minimum.

Suppose there is no change so that stratified or homogeneous combustion is maintained. In this case, the routine proceeds along steps 150, 152, and 156 to step 162. At step 162, the advance limit ADVLMT is set equal to an ordinary value ADVLMT#, for example 4 degrees. The setting is such that ADVLMTSH#>ADVLMT#. As a result, the advance limit ADVLMT increases upon determination of a change between request for stratified combustion and request for homogeneous combustion.

After request for extension of dwell angle has been set, the routine proceeds from step 150 to step 158.

After setting ADVLMT at step 160 or 162, the routine proceeds to step 164. At step 164, the controller 32 determines required time for current to pass through ignition coil based on battery voltage and etc. It converts the determined required time to crankshaft angles at current engine speed and stores the result at target dwell angle TDWLL.

At the next step 166, the controller 32 updates TDWLL by increment of ADVLMT. As mentioned before, ADVLMTSH# is greater than ADVLMT#. Thus, TDWLL that is determined upon occurrence of change between request for stratified combustion and request for homogeneous combustion is greater than TDWLL that is determined under ordinary condition.

At step 168, the controller 32 determines non-dwell angle NDWLL that may be expressed as, $$NDWLL = 720/CYLNDR\# - TDWLL \quad (16),$$

where: CYLINDR# contains number of cylinders of engine (in this embodiment, CYLINDER# is 4 and thus 720/CYLINDER# is 180).

According to this embodiment as shown in FIGS. 12 and 13, a train of REF pulses are generated each at a crankshaft position 110 degrees before TDC. In this embodiment, the ignition timing for #n cylinder is defined by degrees of crankshaft angle (FADV) after a REF pulse that appears 110 degrees (CRSET#) before compression TDC of #n cylinder. Termination of dwell angle (TDWLL) coincides with the ignition timing. Initiation of the dwell angle coincides with termination of non-dwell angle (MDWLL). Initiaton of non-dwell angle (MDWLL) coincides with the preceding REF pulse before the REF pulse 110 immediately before compression TDC. The controller 32 initiates current supply to ignition coil for #n cylinder when the cranksnaft has rotated through the non-dwell angle NDWLL, As readily understood from FIG. 12, 180 (degrees)+FADV=TDWLL+NDWLL. Thus, NDWLL is expressed as NDWLL=180−TDWLL+FADV. It must be noted that NDWLL that has determined at step 168 requires increment of FADV. FADV is determined in FIG. 15 and this increment is done in FIG. 16.

FIG. 15 is a flowchart of a control routine for determining and setting FADV. This control routine is a REF job, so that execution of this routine is initiated upon occurrence of a REF pulse.

At step 170, the controller 32 determines whether or not flag FHINJEXn (n is a cylinder number) is reset equal to 0 (zero). For understanding the flag FHINJEXn, reference should be made to control routine shown in FIG. 4.

Suppose the flag FHINJEXn is 0, indicating that #n cylinder has experienced fuel injection for stratified combustion. In this case, the routine proceeds from step 170 to step 172. At step 172, the controller 32 determines ignition timing (spark advance) ADVS for stratified combustion with respect to #n cylinder, The spark advance is given by crankshaft degrees before compression TDC. The controller 32 has stored in its ROM two ignition timing maps, one for stratified combustion and the other for homogeneous combustion. The map for stratified combustion is used at step 172. Specifically, at step 172, the controller 32 performs a table look-up operation of the map for stratified combustion using engine parameters such as engine speed and Ne and operator power command ACC to determine ADVS. The determined ADVS is stored at ADS.

Suppose the flag FHINJEXn is 1, indicating that an cylinder has experienced fuel injection for homogeneous combustion. In this case, the routine proceeds from step 170 to step 174. At step 1 74, the controller 32 determines ignition timing (spark advance) ADVH for homogeneous combustion, with respect to #n cylinder, by performing a table look-up operation of the map for homogeneous combustion. The routine proceeds to step 176 from step 172 or it proceeds to step 178 from step 174.

At step 176 or 178, the controller 32 finds the state of flag FHINJEFXn-1 for the last cylinder that experienced ignition. Based on the finding, it determines whether or not spark ignition scheduled to take place within #n cylinder is the first spark ignition after change between request for stratified combustion and request for homogeneous combustion.

Suppose flag FHINJEXn-1 and flag FHINJEXn have different logical levels. In this case, the controller 32 determines that the scheduled spark ignition is the first after change between request for stratified combuustion and request for homogeneous combustion, and the routine proceeds to step 180. At step 180, the controller 32 clears request for extension of dwell angne (TDWLL). The request for extension of dwell angle is set during the routine of FIG. 14 immediately after occurrence of the change and then cleared when the controller 32 determines spark advance ADV by executing the routine of FIG. 15, Thus, the extension of dwell angle is carried out during time interval from occurrence of the change between the requests to occurrence of the subsequent determination of ignition timing.

After step 180, the routine proceeds to step 184.

At step 184, the controller 32 determines FADV expressed in degrees of crankshaft angle between a REF pulse immediately before compression TDC of #n cylinder and the determined timing indicated by spark advance ADV by computing an equation as follows, $$FADV = CRSET\# - ADV \quad (17)$$

where: CRSET# contains degrees of crankshaft angle between compression TDC and REF pulse immediately before the compression TDC (in this embodiment, 110 degrees BTDC).

At the next step 186, the controller 32 sets FADV to a counter therefor.

Detection of a POS pulse decreases, by one, content of the counter for FADV.

Comparing FIG. 15 with FIG. 6 reveals that the routine of FIG. 15 is substantially the same as that of FIG. 6 except the addition of steps 176, 178, 180, and 182.

Referring back to FIG. 15, if, the controller 32 determines that spark ignition scheduled to take place within #n cylinder is not the fist immediately after the change between the requests, the routine proceeds from step 172 or 174 to step 182. At step 182, the controller 32 limits a variation of current ADV from the preceding spark advance ADVL determined immediately before within a predetermined window. The advance limit of the window is defined by ADVL+ADVLMT#, while the retard limit thereof is defined by ADVL-RETLMT#. Specifically, the controller 32 updates ADV with (ADVL+ADVLMT#) when the former is greater than the latter, and with (ADVL-RETLMT#) when the former is less than the latter.

When there is no change between the requests, TDWLL is increased by ADLMT# (see steps 162 and 166 in FIG. 14). Thus, limiting the amount of variation in advance direction of ADV by ADVLMT# assures sufficient dwell angle (TDWLL) for maintaining needed spark energy.

The above-mentioned limitation of the variation of ADV is not performed when the routine proceeds from step 176 or 178 to step 184 via step 180. Thus, in this case ADV that has been determined at step 172 or 174 is used to provide ignition timing for #n cylinder.

FIG. 16 is a flowchart of a control routine for determining NDWLL. This control routine is a REF job, so that execution of this routine is initiated upon occurrence of a REF pulse.

At step 190, the controller 32 adds FADV that has been determined at step 184 (FIG. 15) to NDWLL that has been determined at step 168 (FIG. 14) to give the final NDWLL. At step 192, the controller 32 sets this final NDWLL at its counter.

Reference is made to the control routine in FIG. 7 in understanding when a spark is produced at #n cylinder. That is, the spark is produced when the counter for FADV becomes 0.

Referring back to FIG. 12, let us now consider two cases I and II according to the prior art, and two cases III and IV according to the second embodiment. Each of the cases deals with spark ignition control for #3 cylinder.

According to the prior art, initiation of dwell angle (TDWLL) remains the same before and after the request change. In the case I, there is request for stratified combustion, and dwell angle is great enough to provide sufficiently high spark energy. In the case II, there is request for homogeneous combustion, and dwell angle is not great enough for providing sufficiently high spark energy.

According to the second embodiment, the dwell angle is extended over interval beginning with occurrence of request change between stratified combustion and homogeneous combustion and ending with setting of FADV determined in response to new request at occurrence of a REF pulse 110 degrees before compression TDC of #3 cylinder. In case III, there is new request for stratified combustion, and FADV determined in response to the new request has been set for #3 cylinder so that spark is produced at timing for stratified combustion. In case IV, there is new request for homogeneous combustion, and FADV determined in response to the new request has been set for #3 cylinder so that spark is produced at timing for homogeneous combustion. In this case IV, dwell angle is great enough for providing sufficiently high spark energy. In the case III, dwell angle is greater than necessary, resulting in extending time period of passage of current through ignition coil. But the use of this extended dwell angle is limited to production of this spark only, thus minimizing influence on life span of the ignition coil.

According to the second embodiment, the advance and retard limits ADVLIMIT# and RETLMT# restrain variation rate of spark advance ADV within a window. Restraint by these limits is temporarily lifted only when FADV is determined using the spark advance ADV immediately after request change from stratified combustion to stratified change or vice versa. This allows an unlimited great change of spark advance that is required after the request change (see FIGS. 12 and 13).

According to the second embodiment, the dwell angle TDWLL is increased by an amount as great as the advance limit ADVLMT#. After the request change between stratified and homogeneous combustion, the dwell angle TDWLL is increased by an amount as great as an increased advance limit ADVLMTSH# (>ADVLMT#). This assures sufficiently high spark energy at an advanced crankshaft position after the request change from stratified to homogeneous combustion.

In the process of a switch between stratified combustion and homogeneous combustion, there are cases where dwell angle is too elongated after request change from one to the other of stratified combustion and homogeneous combustion. In one case, the request change is from homogeneous combustion to stratified combustion. In this case, as illustrated in case III of FIG. 12, dwell angle TDWLL is increased by an amount as great as the advance limit ADVLMTSH-# to advance the timing of initiating supply of electric current to ignition coil, while the spark timing moves in the retard direction. In the other case, the request change is from stratified combustion to homogeneous combustion, but there is substantial delay until the spark timing moves in the advance direction to the appropriate spark advance for homogeneous combustion. During this delay, the spark timing is left at spark advance for stratified combustion after the timing of initiating supply of electric current to ignition coil has advanced. According to the second embodiment, extension of dwell angle is temporary after request change. Specifically, the extension of well angle is terminated at a moment when spark timing for new request is first set. Thus, elongation of dwell angle than necessary does not have any influence on span of operation life of ignition coil.

Let us now consider cases V and VI shown in FIG. 13. In case V, extension of dwell angle by increment of TDWLL by advance limit ADVLMTSH# does not take place after request change from homogeneous combustion to stratified combustion because the spark timing moves in the retard direction to maintain sufficient dwelt angle. In case VI, extension of dwell angle by increment of TDWLL by advance limit ADVLMTSH# takes place after request change from stratified combustion to homogeneous combustion. From the preceding, it is now appreciated that extension of dwell angle by increment of TDWLL by advance limit ADVLMTSH# proves to be effective in maintaining an appropriate dwell angle in process after request change from stratified combustion to homogeneous combustion.

Figure 17:
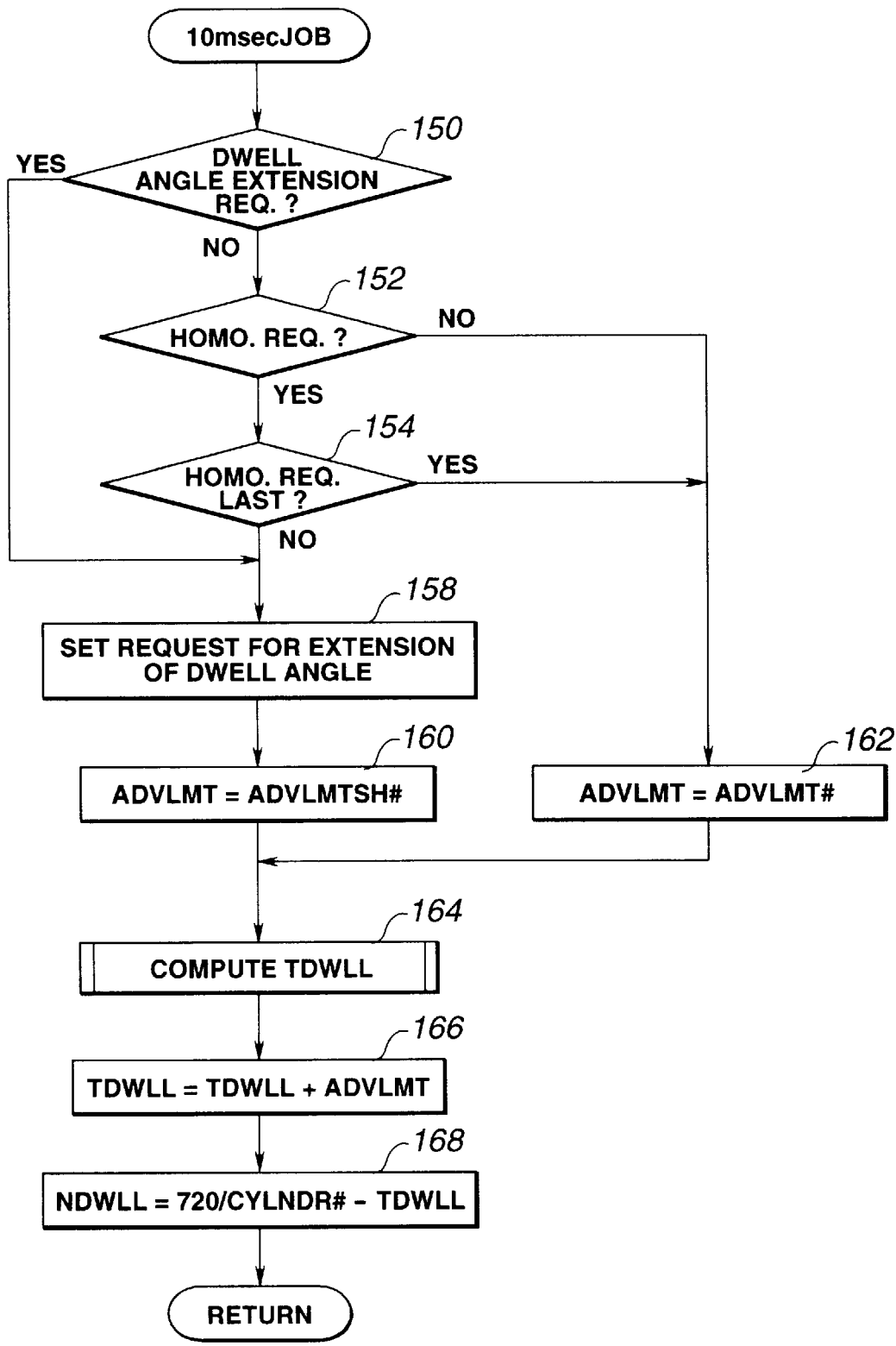
FIG. 17 is a flowchart illustrating an alternative control routine for determining non-dwell angle NDWLL.

FIG. 17 illustrates a control routine that is an alternative to the control routine of FIG. 14. The control routine of FIG. 17 implements the above-mentioned strategy of setting request for extension of dwelt angle upon request change from stratified combustion to homogeneous combustion. Thus, the request for extension of dwell angle is not set upon request change from homogeneous combustion to stratified combustion.

The flowchart of FIG. 17 is substantially the same as the flowchart of FIG. 14 in that the former results from removing interrogation step 156 from the latter.

In FIG. 17, suppose stratified combustion was requested before request change and homogeneous combustion is now requested after the change. In this case, the routine proceeds along steps 152 and 154 to step 158 where request for extension of dwell angle is set. Suppose homogeneous combustion was requested before request change and stratified combustion is now requested after the change. In this case, the routine proceeds along steps 152 and 162 so that the request for extension of dwell angle is not set.

FIGS. 12 and 13 illustrate transient control between two combustion states in four-cylinder internal combustion engine. Apparently, the present invention may be embodied in internal combustion engines having number of cylinders other than four.

In the control routine of FIG. 14 or FIG. 17, the dwell angle TDWLL is increased at step 166 to advance timing of initiation of supply of electric current to ignition coil. The timing of initiation of supply of electric current may be advanced by directly decreasing non-dwell angle NDWLL.

What is claimed is:

1. A vehicle engine control system responsive to a change between a first request for homogeneous charge combustion and a second request for stratified charge combustion, said vehicle engine control system comprising:

a spark-ignition cylinder-injection internal combustion engine having cylinders, each performing an intake phase, a compression phase, a power phase, and an exhaust phase;

said cylinders each, when rendered operable in a first mode, experiencing first fuel injection at a first fuel injection timing during intake phase thereof and first spark ignition at a first ignition timing to initiate homogeneous charge combustion;

said cylinders each, when rendered operable in a second mode, experiencing second fuel injection at a second fuel injection timing during compression phase and second spark ignition at a second ignition timing to initiate stratified charge combustion;

a fuel injection manager being operable to set one of said first fuel injection and second fuel injection for said cylinders in a predetermined sequential order in response to one of the first and second request; and a spark ignition manager being operable to set one of said first spark ignition and second spark ignition for said cylinders in the predetermined sequential order in response to one of said first fuel injection and said second fuel injection that has been set to each of said cylinders.

2. A vehicle engine control system as claimed in claim 1, wherein said spark ignition manager is operable to set, for said cylinders one after another, said first ignition timing in the presence of execution of said first fuel injection and said second ignition timing in the absence of execution of said first fuel injection.

3. A vehicle engine control system as claimed in claim 1, wherein said fuel injection manager is operable to set, for said cylinders one after another, said first fuel injection timing and said second fuel injection timing;

wherein, for one of said cylinders, said fuel injection manager is operable to command execution of said first fuel injection at said first fuel injection timing when said first fuel injection has been set to said one cylinder and avoid second fuel injection at said second fuel injection timing in the presence of immediately preceding execution of said first fuel injection; and wherein, for one of said cylinders, said fuel injection manager is operable to avoid execution of said first fuel injection at said first fuel injection timing when said second fuel injection has been set to said one cylinder and command execution of said second fuel injection at said second fuel injection timing in the absence of immediately preceding execution of said first fuel injection.

4. A vehicle engine control system as claimed in claim 1, wherein, for one of said cylinders, said fuel injection manager is operable to compute first fuel injection quantity for said first fuel injection when said first fuel injection has been set and compute second fuel injection quantity for said second fuel injection when said second fuel injection has been set.

5. A vehicle engine control system as claimed in claim 4, wherein, for one of said cylinders, said fuel injection manager is operable to hold the last value resulting from computing first fuel injection after a change from said first fuel injection to said second fuel injection that is set to said one cylinder; and said fuel injection manager is operable to hold the last value resulting from computing second fuel injection after a change from said second fuel injection to said first fuel injection that is set to said one cylinder.

6. A vehicle engine control system as claimed in claim 1, wherein, for one of said cylinders, said spark ignition manager is operable to compute first ignition timing when said first fuel injection has been set and compute second ignition timing when said second fuel injection has been set.

7. A vehicle engine control system as claimed in claim 6, wherein, for one of said cylinders, said spark ignition manager is operable to hold the last value resulting from computing first ignition timing after a change from said first fuel injection to said second fuel injection that is set to said one cylinder; and said spark ignition manager is operable to hold the last value resulting from computing second ignition timing after a change from said second fuel injection to said first fuel Injection that is set to said one cylinder.

8. A vehicle engine control system as claimed in claim 6, wherein said spark ignition manager is operable to compute MBT in determining said first ignition timing.

9. A vehicle engine control system as claimed in claim 6, wherein said spark ignition manager is operable to refer to map in determining said second ignition timing.

10. A vehicle engine control system as claimed in claim 1, wherein said spark ignition manager is operable to advance timing to initiate supply of electric current to ignition coil for production of spark in response to the change between the first request for homogeneous charge combustion and the second request for stratified charge combustion.

11. A vehicle engine control system as claimed in claim 1, wherein said spark ignition manager is operable to advance timing to initiate supply of electric current to ignition coil for production of spark in response to only a change to the first request for homogeneous charge combustion from the second request for stratified charge combustion.

12. A vehicle engine control system as claimed in claim 10, wherein said spark ignition manager is operable to maintain control to advance timing to initiate supply of electric current to the ignition coil over interval beginning with the change between the first request for homogeneous charge combustion and the second request for stratified charge combustion and ending with setting of ignition timing for new request after the change.

13. A vehicle engine control system as claimed in claim 11, wherein said spark ignition manager is operable to maintain control to advance timing to initiate supply of electric current to the ignition coil over interval beginning with the change to the first request for homogeneous charge combustion from the second request for stratified charge combustion and ending with setting of ignition timing for new request after the change.

14. A vehicle engine control system as claimed in claim 10, wherein said spark ignition manager is operable to compute dwell angle and increase said computed dwell angle by a spark advance limit, and said spark ignition manager uses said increased dwell angle to advance timing to initiate supply of electric current to the ignition coil, and wherein said spark ignition manager is operable to modify said spark advance in response to the change between the first request for homogeneous charge combustion and the second request for stratified charge combustion.

15. A vehicle engine control system as claimed in claim 14, wherein said spark advance limit is variable depending upon engine speed.

16. A vehicle engine control system as claimed in claim 14, wherein said spark advance limit that is used to increase the computed dwell angle is a function of a difference between said first and second ignition timings.

17. A vehicle engine control system as claimed in claim 10, wherein said spark advance manager is operable to lift restrain imposed by an advance limit and a retard limit to allow determination of ignition timing, without said restraint, immediately after the change between the first request for homogeneous charge combustion and the second request for stratified charge combustion.

* * * * *